US 7,346,042 B2

(12) United States Patent
Horiguchi et al.

(10) Patent No.: US 7,346,042 B2
(45) Date of Patent: Mar. 18, 2008

(54) INFORMATION DISTRIBUTING METHOD, INFORMATION DISTRIBUTING SYSTEM, INFORMATION DISTRIBUTING SERVER, MOBILE COMMUNICATION NETWORK SYSTEM AND COMMUNICATION SERVICE PROVIDING METHOD

(75) Inventors: Shoichi Horiguchi, Kanagawa (JP);
Hiroshi Uehara, Kanagawa (JP);
Shoichiro Ishigaki, Tokyo (JP);
Sadayuki Hongo, Kanagawa (JP);
Nobuhiko Shigiya, Tokyo (JP);
Katsumi Tanaka, Hyogo (JP);
Kazutoshi Sumiya, Hyogo (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 1365 days.

(21) Appl. No.: 09/790,236

(22) Filed: Feb. 21, 2001

(65) Prior Publication Data
US 2001/0015972 A1    Aug. 23, 2001

(30) Foreign Application Priority Data

| Feb. 21, 2000 | (JP) | ............................ 2000-043636 |
| Aug. 18, 2000 | (JP) | ............................ 2000-248350 |
| Aug. 22, 2000 | (JP) | ............................ 2000-251563 |
| Aug. 30, 2000 | (JP) | ............................ 2000-261359 |
| Oct. 12, 2000 | (JP) | ............................ 2000-312628 |

(51) Int. Cl.
*H04L 12/66* (2006.01)

(52) U.S. Cl. ...................................... 370/352; 370/493

(58) Field of Classification Search ................ 370/328, 370/338, 353, 354, 395.52, 432, 465, 466, 370/345, 351, 392, 396, 493, 494, 495, 498, 370/310, 352, 356, 386, 400, 401; 709/201, 709/202, 218, 223, 219, 227, 229
See application file for complete search history.

(56) References Cited

U.S. PATENT DOCUMENTS

| 5,717,854 A | * | 2/1998 | Egawa et al. ................ 709/219 |
| 5,727,159 A | | 3/1998 | Kikinis .................... 395/200.76 |
| 5,757,510 A | | 5/1998 | Okada | |

(Continued)

FOREIGN PATENT DOCUMENTS

CN        1195445 A     10/1998

(Continued)

OTHER PUBLICATIONS

C. Asakawa et al., "Nonvisual Web Access System", Research Report of Information Processing Society of Japan, vol. 98, issue 22, 98-HI-77, Mar. 10, 1998, pp. 57-62.

(Continued)

*Primary Examiner*—Phirin Sam
(74) *Attorney, Agent, or Firm*—Workman Nydegger

(57) ABSTRACT

An information distributing method etc. are provided. An information providing server comprises a first transmission device for transmitting image data to a communication terminal, a first conversion device for converting attached information attached to the image data into converted information of a format suitable for aural read-out, a second conversion device for converting the converted information into voice information, a second transmission device for transmitting the voice information and/or the converted information to the communication terminal, and a third transmission device for transmitting synchronizing information for synchronizing image data with the voice information on a screen of the communication terminal.

19 Claims, 16 Drawing Sheets

U.S. PATENT DOCUMENTS

| | | | | |
|---|---|---|---|---|
| 5,911,485 | A * | 6/1999 | Rossmann | 341/22 |
| 5,930,752 | A * | 7/1999 | Kawaguchi et al. | 704/270.1 |
| 6,044,397 | A * | 3/2000 | Eleftheriadis et al. | 725/139 |
| 6,173,316 | B1 | 1/2001 | De Boor et al. | 709/218 |
| 6,195,677 | B1 * | 2/2001 | Utsumi | 709/201 |
| 6,208,626 | B1 * | 3/2001 | Brewer | 370/324 |
| 6,269,336 | B1 * | 7/2001 | Ladd et al. | 704/270 |
| 6,307,641 | B1 * | 10/2001 | Hamano et al. | 358/1.15 |
| 6,330,447 | B1 * | 12/2001 | Hengeveld | 455/436 |
| 6,334,126 | B1 * | 12/2001 | Nagatomo et al. | 707/4 |
| 6,341,133 | B1 * | 1/2002 | Kawamoto et al. | 370/401 |
| 6,363,425 | B1 * | 3/2002 | Hook et al. | 709/226 |
| 6,370,543 | B2 * | 4/2002 | Hoffert et al. | 707/104.1 |
| 6,381,513 | B1 * | 4/2002 | Takase et al. | 700/231 |
| 6,430,624 | B1 * | 8/2002 | Jamtgaard et al. | 709/246 |
| 6,661,529 | B2 * | 12/2003 | Sanbongi et al. | 358/1.15 |
| 6,668,046 | B1 * | 12/2003 | Albal | 379/119 |
| 6,704,784 | B2 * | 3/2004 | Matsuda et al. | 709/224 |
| 6,795,506 | B1 * | 9/2004 | Zhang et al. | 375/240.26 |
| 7,061,910 | B2 * | 6/2006 | Beshai | 370/392 |
| 2003/0154261 | A1 * | 8/2003 | Doyle et al. | 709/218 |
| 2003/0206554 | A1 * | 11/2003 | Dillon | 370/432 |
| 2004/0010559 | A1 * | 1/2004 | Han | 709/206 |

FOREIGN PATENT DOCUMENTS

| | | |
|---|---|---|
| EP | 554 456 | 2/1993 |
| EP | 0848373 A2 | 6/1998 |
| GB | 2307619 A | 5/1997 |
| JP | 63-127645 | 5/1988 |
| JP | 01-188065 | 7/1989 |
| JP | 1-188065 | 7/1989 |
| JP | 4-025270 | 1/1992 |
| JP | 6-245208 | 9/1994 |
| JP | 07-135578 | 5/1995 |
| JP | 10-149195 | 6/1998 |
| JP | 10-322478 | 12/1998 |
| JP | 11-32319 | 2/1999 |
| JP | 11-134169 | 5/1999 |
| JP | 11-175426 | 7/1999 |
| JP | 11-249951 | 9/1999 |
| JP | 11-327870 | 11/1999 |
| JP | 2000-207167 | 7/2000 |
| WO | WO 93/02516 | 2/1993 |
| WO | WO 97/09704 | 3/1997 |
| WO | WO 97/11549 | 3/1997 |
| WO | WO 99/51055 | 10/1999 |
| WO | WO 00/04679 | 1/2000 |
| WO | WO 00/21057 | 4/2000 |
| WO | WO00/39710 | 7/2000 |

OTHER PUBLICATIONS

Deploying Speech Applications Over the Web David Goddeau, William Goldenthal, and Chris Weikart pp. 685-688.

Office communication ; Ref. No. JP/EH/5405830.

GloMop: Global Mobile Computing By Proxy XP-002094009 Sep. 13, 1995.

Official Notice of Rejection Patent Application 2000-251563 Case No. DCMH120073.

Official Notice of rejection Patent Application 2000-312628 Case No. DCMH120229.

Voice Aided Web Navigation for Mobile Environments Kazuyuki Soda, Kazutoshi Sumiya, Kuniaki Uehara Jul. 27, 2000.

Official Notice of Rejection: Case No. DCMH120229; Patent Application No. 2000-312628.

Official Notice of Rejection: Case No. DCMH120073; Patent Application No. 2000-251563.

Performance Evaluation of Stored Media Synchronization in PHS Masami Kato, Noriyoshi Usui, and Shuji Tasaha Jan. 1997 p. 129-136.

Official Notice of Rejection Patent Application No. 2000-261359 Case No. DCMH120179.

* cited by examiner

FIG.3

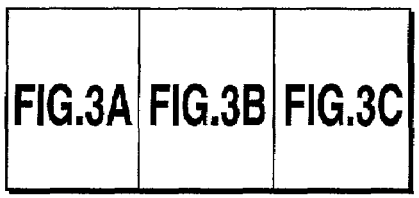

FILTERING SERVICE

GENERAL WEB PAGE

```
<HTML>
<HEAD>
<TITLE>* aaaa aaaaa *</TITLE>
<style type="text/css">
</style>
</HEAD>
<BODY BGCOLOR="#ffffff" TEXT="#666666" LINK="#ffcc66" VLINK="#66ccff"
ALINK="#ccffff">
<TABLE CELLSPACING="0" CELLPADDING="0" BORDER="0">
<TR><TD WIDTH="400" VALIGN="top">
<img src="../img/ne_title.gif" width=302 height=51 alt=" bbbbb "><br>
  <font class="read" size="-1" color="#666666"><b> cc c cccccccc ccccc <br>
  ddddd dddd
</b></font>
</TD><TD WIDTH="80" ALIGN="right" VALIGN="top">
<a href="../index.htm" target="_top"><img src="../img/rogo_s.gif" width="59" height="49"
border="0" alt=" aaaa aaaaaa "></a><br><img src="../img/ne_still.gif" width="80"
height="26" alt=" bbbbb ">
</TD></TR><TR><TD COLSPAN=2 HEIGHT=20><img src="../img/dummy.gif" width=480
height=20></TD></TR></TABLE>
<TABLE WIDTH=480 CELLSPACING=0 CELLPADDING=0 BORDER=0>
<TR><TD ALIGN="center" VALIGN="top">
<table width=400 cellspacing=15 cellpadding=0 border=0>
<tr><td valign="top">
<img src="../img/ne_kei04.gif" width=367 height=3></td></tr>
<tr><td valign="top">
<font size="+1" color="#3399cc"><b>
eeee eeeeeee eeee!
</b></font>
</td></tr><tr><td valign="top">
<div class="list">
<b> fff fffffff ffff fff ffff ffffffff ffff ff ffff fff f
   ffffffff ffff fff ffff ffff ffff fff ffff ffffffff ffff ff
   ffff fff f ffffffff ffff fff ffff  ffff ffff fff ffff
   ffffffff ffff ff ffff fff f ffffffff ffff fff ffff ffff ffff
   fff ffff ffffffff ffff ff ffff fff
<p>
<img src="photo/02070201.gif" width=200 height=180 hspace=8 vspace=8 align="right">
</div>
</td></tr></table>
</TD></TR><TR><TD HEIGHT=10 COLSPAN=2><img src="../img/dummy.gif" width=480
height=10>
</TD></TR></TABLE>
<TABLE BORDER="0" WIDTH="480" CELLSPACING="0" CELLPADDING="0">bbbbb
<TR><TD WIDTH=385 ALIGN="right" VALIGN="bottom">
<a href="http://www.yomiuri.co.jp/komachi/news/index.htm" target="_top"><b>
TOP●</b></a><br>
</TD></TR></TABLE>
<TABLE BORDER="0" WIDTH="480" CELLSPACING="0" CELLPADDING="0">
<TR><TD ALIGN="right">
<a href="http://www.yomiuri.co.jp/" target="_top"><img src="../img/yol_p.gif" width="68"
height="17" border=0 alt="Yomiuri On-Line"></a><br>
<font size="1" class="copyright">Copyright 2000 The Yomiuri Shimbun</font>
</TD></TR></TABLE>
</BODY>
</HTML>
```

FIG.3A

TAGS FUNCTIONING ON
READ-OUT WEB PAGE (1) EXAMPLE OF TAGS
    LEFT FOR READ-OUT

<HTML></HTML>
<TITLE></TITLE>
<BODY></BODY>
<LI></LI>
<DD></DD>
<BR>

(2) EXAMPLE OF ADDITION
    OF PARAMETER TO TAG
<IMG alive="5" ></IMG>
MEANING: DISPLAY FOR
         FIVE SECONDS

REPRODUCED IMAGE ON
COMMUNICATION TERMINAL

DISPLAY             READ-OUT

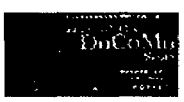

aaaa aaaaa
                    cc c cccccccc
                    ccccc
                    ddddd dddd
                    eeee eeeeeee
                    eeee!

fff fffffff
                    ffff fff ffff
                    ffffffff ffff
DISPLAY             ff ffff fff f
CONTINUING          ffffffff ffff
FOR                 fff ffff ffff
SPECIFIED           ffff fff ffff
SECONDS             ffffffff ffff
                    ff ffff fff f
                    ffffffff ffff
                    fff ffff ffff
                    ffff fff ffff
                    ffffffff ffff
                    ff ffff fff f
                    ffffffff ffff
                    fff ffff ffff
                    ffff fff ffff
                    ffffffff ffff
                    ff ffff fff

FIG.3C

INFORMATION DISTRIBUTING METHOD, INFORMATION DISTRIBUTING SYSTEM, INFORMATION DISTRIBUTING SERVER, MOBILE COMMUNICATION NETWORK SYSTEM AND COMMUNICATION SERVICE PROVIDING METHOD

This application claims the priority of Japanese Patent Application Nos. 2000-43636, filed Feb. 21, 2000, 2000-248350, filed Aug. 18, 2000, 2000-251563, filed Aug. 22, 2000, 2000-261359, filed Aug. 30, 2000 and 2000-312628, filed Oct. 12, 2000, the content of which is incorporated hereinto by reference.

BACKGROUND OF THE INVENTION

1. Field of the Invention

The preset invention relates to an information distributing method, an information distributing system, an information distributing server, a mobile communication network system, and communication service providing method.

2. Description of Related Art

Web pages from a WWW server can conventionally be viewed using software (hereafter referred to as a "browser") having a browser function installed in a communication terminal such as a personal computer, a PDA (Personal Digital Assistants), or a mobile station. Browsers include those for personal computers such as the Netscape Communicator (product name) from Netscape Communications (company name) in the U.S. and the Internet Explorer (product name) from the Microsoft (company name) in the U.S., and those exclusively used for mobile stations or PDAs.

If, however, the browser is displayed on a small screen (if, for example, Web pages are viewed in a small display mounted in a mobile station, a PDA, and the like, or a personal computer user sets a browser display screen for a small size), Web pages are disadvantageously not displayed as intended by producers.

Additionally, in this case, a Web page viewer disadvantageously requires a large amount of time to scroll the browser display screen.

Further, a user viewing Web pages while navigating therethrough using radio communication and a mobile station, a PDA, and the like, may be involved in a traffic accident when visually obtaining information while scrolling a desired Web page, and the user thinks the scroll operation complicated and cumbersome.

Third-generation mobile communication networks such as the IMT-2000 employ a multicall function to enable mobile stations to execute simultaneous communication using a plurality of communication channels, for example, a voice channel and a packet channel.

However, in information distributing services in conventional mobile communication networks which distribute information from content servers and the like to portable terminals, individual communication channels are independently provided with services and it is disadvantageously impossible to provide services for sequentially distributing information using a plurality of communication channels in such a manner that a group of data comprising different types of continuous data (such as voice and image data, for example) are divided into files of data each of which can be displayed in one screen of a portable terminal so that search, skip, rewind, page navigation, and the like can be controlled based on index information (link information and the like) for the files obtained by the division.

In addition, in the information distributing services in the conventional mobile communication networks which distribute information from content servers and the like to portable terminals, it is disadvantageously impossible to provide services for sequentially distributing a group of data comprising different types of continuous data (such as voice and image data), using a plurality of communication channels.

Further, in the information distributing services in the conventional mobile communication networks, it is disadvantageously impossible to provide the same service using a plurality of communication channels.

SUMMARY OF THE INVENTION

In view of these problems, it is an object of the present invention to provide an information distributing method and system that can display Web pages as intended by the producer.

It is another object of the present invention to provide an information distributing method and system that can reduce the amount of time required to scroll a browser display screen.

It is further another object of the present invention to provide an information distributing method and system that can aurally obtain information from a desired Web page.

It is further another object of the present invention to provide an information distributing method and system for information distribution using different communication channels, which method and system can provide services that divide a group of data comprising different types of continuous data into files of data each of which can be displayed in one screen of a portable terminal so that search, skip, rewind, page navigation, and the like can be controlled based on index information for the files obtained by the division.

It is further another object of the present invention to provide an information distributing method and system that can provide services that sequentially distribute a group of data comprising different types of continuous data, using a plurality of communication channels.

It is further another object of the present invention to provide a mobile communication network system and a communication service providing method that can identify and determine different communication channels to belong to the same service to provide services using a plurality of communication channels.

To attain these objects, in a first aspect of the present invention, an information distributing method according to the present invention is that which distributes provided information including image data and/or attached information attached to the image data, from an information providing server to a communication terminal via a network, the information distributing method comprising a transmission step of transmitting the provided information to the communication terminal, a screen display step of displaying the image data and/or the attached information on a screen at the communication terminal, and a voice output step of aurally outputting the attached information. Since this method thus comprises the transmission step of transmitting the provided information to the communication terminal, the screen display step of displaying the image data and/or the attached information on the screen at the communication terminal, and the voice output step of aurally outputting the attached information, the attached information such as text information is converted into voice information as appropriate so that Web pages can be displayed on the screen while voices can be output therefrom, as intended by the producer. Additionally, information can be aurally obtained from a desired Web page.

Here, the method may further comprise a synchronization step of synchronizing the screen display by the screen display step with the voice output by the voice output step. Since the method further comprises the synchronization step of synchronizing the screen display by the screen display step with the voice output by the voice output step, Web pages having synchronized voices and images can be displayed to enable program broadcasting in mobile stations. In this synchronization method, a control engine 110 in an information processing server 100 may operate to control a read engine 112 and a display engine 114 to synchronize transmission of read-out data 104 to a mobile station 500 with transmission of displayed data 108 thereto, or synchronization control information 106 may be transmitted to the mobile station 500, which then synchronizes output of the read-out data 104 with output of displayed data 108 based on the synchronization control information 106.

Here, the transmission step may transmit the provided information through a plurality of channels. Thus, in the transmission step, the provided information is provided through the plurality of channels, thereby enabling more efficient data transmission.

Here, the plurality of channels may include a packet channel and a voice channel.

Here, the transmission step may transmit the provided information based on a distribution request command from the communication terminal. Thus, in the transmission step, the provided information is transmitted based the distribution request command from the communication terminal, thereby enabling what is called PULL type information distributing services to be executed more efficiently.

Here, the transmission step may transmit the provided information to the communication terminals belonging to a particular group or all the communication terminals. Thus, in the transmission step, the provided information is transmitted to the communication terminals belonging to a certain particular group or all the communication terminals, thereby efficiently providing broadcasting or program broadcasting to a plurality of users to enable what is called PUSH type information distributing services to be executed more efficiently.

Here, the transmission step may transmit the provided information to the communication terminal of a particular subscriber that has contracted for distribution of the provided information. Thus, in the transmission step, the provided information is transmitted to the communication terminal of a particular subscriber that has contracted for distribution of the provided information, thereby efficiently providing broadcasting or program broadcasting to a plurality of users to enable what is called PUSH type information distributing services to be executed more efficiently.

Here, the attached information may be converted information that has been converted to have a desired format suitable for aural read-out. The attached information has thus been converted to have the desired format suitable for aural read-out, thereby enabling a conversion operation on a mobile station to be further simplified.

In a second aspect of the present invention, an information distributing system according to the present invention is that which distributes provided information including image data from an information providing server to a communication terminal via a network, the information providing server comprising first transmission means for transmitting the image data to the communication terminal, first conversion means for converting attached information attached to the image data into converted information of a format suitable for aural read-out, second conversion means for converting the converted information into voice information, second transmission means for transmitting the voice information and/or the converted information to the communication terminal, and third transmission means for transmitting synchronizing information for synchronizing the image data with the voice information on a screen of the communication terminal, and the communication terminal comprising means for displaying the image data and/or the converted information on the screen based on the synchronizing information and means for aurally outputting the voice information based on the synchronizing information.

Here, the first transmission means may further comprise means for transmitting the image information to the communication terminal through a first channel, the second transmission means may further comprise means for transmitting the voice information and/or the converted information to the communication terminal through a second channel that is different from the first channel, and the third transmission means may further comprise means for transmitting the synchronizing information to the communication terminal through the first channel.

Here, the first channel may be a packet channel, and the second channel may be a voice channel.

In a third aspect of the present invention, an information distributing system according to the present invention is that which comprises a providing device for providing an markup language file distributed to a communication terminal via a network and a processing device for processing the markup language file, the processing device comprising generation means for analyzing tags in the markup language file to generate read-out data, displayed data containing anchor information with its links set in another markup language file, and synchronization control information for synchronizing the read-out data with the displayed data, and control means for providing such control that the read-out data and the displayed data are synchronously transmitted to the communication terminal based on the synchronization control information, and the communication terminal comprising reception means for receiving the read-out data and the displayed data, voice output means for converting the read-out data into voice data for aural output, screen display means for displaying the displayed data on a screen, and selection means for selecting the anchor information displayed on the screen. Thus, the anchor information can be embedded in a text that will be a source of aural read-out, so that this information can be displayed on a display in synchronism with read-out of the anchor information comprising important words. Consequently, the displayed anchor information can be used to allow a user to hierarchically view and listen to information. Additionally, a hierarchical information-viewing method using a hyper text technique and the like and which has only been implemented using text information can be easily introduced into a voice information-listening system. Further, a user listening to voice information in read-out data can easily access a portion of the read-out voice information which the user desires to know in further detail.

In a fourth aspect of the present invention, an information distributing system according to the present invention is that which comprises a providing device for providing an markup language file distributed to a communication terminal via a network and a processing device for processing the markup language file, the processing device comprising generation means for analyzing tags in the markup language file to generate read-out data, displayed data containing anchor information with its links set in another markup language file, and synchronization control information for synchronizing the read-out data with the displayed data, voice converting means for converting the read-out data into voice data, packet converting means for converting the displayed data into packet data, and control means for providing such control that the voice data and the packet data are synchronously transmitted to the communication terminal based on the synchronization control information, and the communication terminal comprising reception means for receiving the voice data and the packet data, voice output means for aurally outputting the voice data, screen display means for converting the packet data into the displayed data to display the displayed data on a screen, and selection means for selecting the anchor information displayed on the screen. Thus, the anchor information can be embedded in a text that will be a source of aural read-out, so that this information can be displayed on a display in synchronism with read-out of the anchor information comprising important words. Consequently, the displayed anchor information can be used to allow a user to hierarchically view and listen to information. Additionally, a hierarchical information-viewing method using a hyper text technique and the like which has only been implemented using text information can be easily introduced into a voice information-listening system. Further, a user listening to voice information in read-out data can easily access a portion of the read-out voice information which the user desires to know in further detail.

In a fifth aspect of the present invention, an information distributing method according to the present invention is that which is for an information distributing system comprising a providing device for providing an markup language file distributed to a communication terminal via a network and a processing device for processing the markup language file, the information distributing method comprising at the processing device, a generation step of analyzing tags in the markup language file to generate read-out data, displayed data containing anchor information with its links set in another markup language file, and synchronization control information for synchronizing the read-out data with the displayed data, at the processing device, a control step of providing such control that the read-out data and the displayed data are synchronously transmitted to the communication terminal based on the synchronization control information, at the communication terminal, a voice output step of converting the read-out data into voice data for aural output, at the communication terminal, a screen display step of displaying the displayed data on a screen, and at the communication terminal, a selection step of selecting the anchor information displayed on the screen. Thus, the anchor information can be embedded in a text that will be a source of aural read-out, so that this information can be displayed on a display in synchronism with read-out of the anchor information comprising important words. Consequently, the displayed anchor information can be used to allow a user to hierarchically view and listen to information. Additionally, a hierarchical information-viewing method using a hyper text technique and the like which has only been implemented using text information can be easily introduced into a voice information-listening system. Further, a user listening to voice information in read-out data can easily access a portion of the read-out voice information which the user desires to know in further detail.

In a sixth aspect of the present invention, an information distributing method according to the present invention is that which is for an information distributing system comprising a providing device for providing an markup language file distributed to a communication terminal via a network and a processing device for processing the markup language file, the information distributing method comprising at the processing device, a generation step of analyzing tags in the markup language file to generate read-out data, displayed data containing anchor information with its links set in another markup language file, and synchronization control information for synchronizing the read-out data with the displayed data, at the processing device, a voice converting step of converting the read-out data into voice data, at the processing device, a packet converting step of converting the displayed data into packet data, at the processing device, a control step of providing such control that the voice data and the packet data are synchronously transmitted to the communication terminal based on the synchronization control information, at the communication terminal, a voice output step of aurally outputting the voice data, at the communication terminal, a screen display step of converting the packet data into the displayed data to display the displayed data on a screen, and at the communication terminal, a selection step of selecting the anchor information displayed on the screen. Thus, the anchor information can be embedded in a text that will be a source of aural read-out, so that this information can be displayed on a display in synchronism with read-out of the anchor information comprising important words. Consequently, the displayed anchor information can be used to allow user to hierarchically view and listen to information. Additionally, a hierarchical information-viewing method using a hyper text technique and the like which has only been implemented using text information can be easily introduced into a voice information-listening system. Further, a user listening to voice information in read-out data can easily access a portion of the read-out voice information which the user desires to know in further detail.

In a seventh aspect of the present invention, an information distributing server according to the present invention is that which transmits a content received from a content server for providing a content to a portable terminal using a plurality of communication channels, the information distributing server comprising means for dividing the content received from the content server into data of each page and voices corresponding to the data, means for creating index information for the data, and means for transmitting the voices, and the data and the index information to the portable terminal via separate communication channels.

In an eighth aspect of the present invention, an information distributing method according to the present invention is that which uses a portable terminal, a content server for providing a content, and an information distributing server for transmitting the content to the portable terminal using a plurality of communication channels, the information distributing method comprising at the information distributing server, a step of dividing the content received from the content server into data of each data and voices corresponding to the data, at the information distributing server, a step of creating index information for the data, and a step of transmitting the voices, and the data and the index information from the information distributing server to the portable terminal via separate communication channels.

In a ninth aspect of the present invention, an information distributing system according to the present invention is that which comprises a portable terminal, a content server for providing a content, and an information distributing server for transmitting the content to the portable terminal using a plurality of communication channels, the information distributing system comprising at the information distributing server, means for dividing the content received from the content server into data of each page and voices corresponding to the data, at the information distributing server, means for creating index information for the data, and means for transmitting the voices, and the data and the index information from the information distributing server to the portable terminal via separate communication channels.

According to the seventh to ninth aspects of the present invention, in the information distributing server, system, and method of the present invention, the information distributing server divides each page of the content received from the content server into data and voices corresponding to the data. The information distributing means creates index information for the data. It transmits the voices, the data, and the index information to the portable terminal via the separate communication channel. Thus, services can be provided which divide a group of data comprising different types of continuous data into files of data each of which can be displayed in one screen of the portable terminal so that search, skip, rewind, page navigation, and the like can be controlled based on the index information for the files obtained by the division.

In a tenth aspect of the present invention, an information distributing server according to the present invention is that which transmits a content received from a content server for providing a content to a portable terminal using a plurality of communication channels, the information distributing server comprising means for separating the content received from the content server into voices and data, means for calculating the amount of time required to transmit the voices and the data, and means for transmitting the voices and the data to the mobile terminal via separate communication channels in accordance with the maximum amount of transmission time.

In an eleventh aspect of the present invention, an information distributing method according to the present invention is that which uses a portable terminal, a content server for providing a content, and an information distributing server for transmitting the content to the portable terminal using a plurality of communication channels, the information distributing method comprising at the information distributing server, a step of separating the content received from the content server into voices and data, at the information distributing server, a step of calculating the amount of time required to transmit the voices and the data, and at the information distributing server, a step of transmitting the voices and the data to the mobile terminal via separate communication channels in accordance with the maximum amount of transmission time.

In a twelfth aspect of the present invention, an information distributing system according to the present invention is that which comprises a portable terminal, a content server for providing a content, and an information distributing server for transmitting the content to the portable terminal using a plurality of communication channels, the information distributing system comprising at the information distributing server, means for separating the content received from the content server into voices and data, at the information distributing server, means for calculating the amount of time required to transmit the voices and the data, and at the information distributing server, means for transmitting the voices and the data to the mobile terminal via separate communication channels in accordance with the maximum amount of transmission time.

In a tenth to twelfth aspects of the present invention, the information distributing server separates the received content into voices and data, calculates the amount of time required to transmit the voices and the data, and transmits the voices and the data to the mobile terminal via the separate communication channels in accordance with the maximum amount of transmission time. Consequently, a group of data comprising different types of continuous data can sequentially be distributed to the mobile terminal via another communication terminal using as a reference the calculated amount of time required to transmit the voices and the data. Additionally, the mobile terminal can reference the content without being conscious of synchronization of the set of the group of data.

In a thirteenth aspect of the present invention, a mobile communication network system according to the present invention is that which comprises a source terminal, a destination terminal, and an identification device for identifying communication channels, for providing a communication service from the source terminal to the destination terminal using a plurality of communication channels, the mobile communication network system comprising means for connecting the source terminal to the destination terminal using a first communication channel, means for registering the first communication channel in the identification device, means for connecting the source terminal to the destination terminal using a second communication channel, means for registering the second communication channel in the identification device in such a manner as to correspond to the first communication channel, and means for communicating a correspondence between the first and second communication channels from the identification device to the destination terminal.

In a fourteenth aspect of the present invention, a communication service providing method according to the present invention is that which operates in a mobile communication network system comprising a source terminal, a destination terminal, and an identification device for identifying communication channels, to provide a communication service from the source terminal to the destination terminal using a plurality of communication channels, the communication service providing method comprising a step of connecting the source terminal to the destination terminal using a first communication channel, a step of registering the first communication channel in the identification device, a step of connecting the source terminal to the destination terminal using a second communication channel, a step of registering the second communication channel in the identification device in such a manner as to correspond to the first communication channel, and a step of communicating a correspondence between the first and second communication channels from the identification device to the destination terminal.

According to the thirteenth and fourteenth aspects of the present invention, the source terminal is connected to the destination terminal using the first communication channel, the first communication channel is registered in the identification device, the source terminal is connected to the destination terminal using the second communication channel, the second communication channel is registered in the identification device in such a manner as to correspond to the first communication channel, and the correspondence between the first and second communication channels is communicated from the identification device to the destination terminal. Correspondingly, the different communication channels can be identified and determined to belong to the same service to provide a mobile communication network system and communication service providing method that can provide services using a plurality of different communication channels.

Additionally, the destination terminal can thus recognize that packet and voice communications belong to the same service, while the source terminal can unify the plurality of communication channels for the destination terminal to simultaneously transmit a composite content.

The above and other objects, effects, features and advantages of the present invention will become more apparent from the following description of an embodiment thereof taken in conjunction with the accompanying drawings.

BRIEF DESCRIPTION OF THE DRAWINGS

FIG. 3 is a diagram showing relationship between FIGS. 3A, 3B and 3C;

FIGS. 3A, 3B and 3C are views useful in explaining an example of the concept of information processing and conversion according to the present invention;

DETAILED DESCRIPTION OF THE PREFERRED EMBODIMENTS

The best mode for carrying out the present invention will be described in detail with reference to the drawings.

First Embodiment

The first embodiment of the present invention will be explained below.

Figure 1:
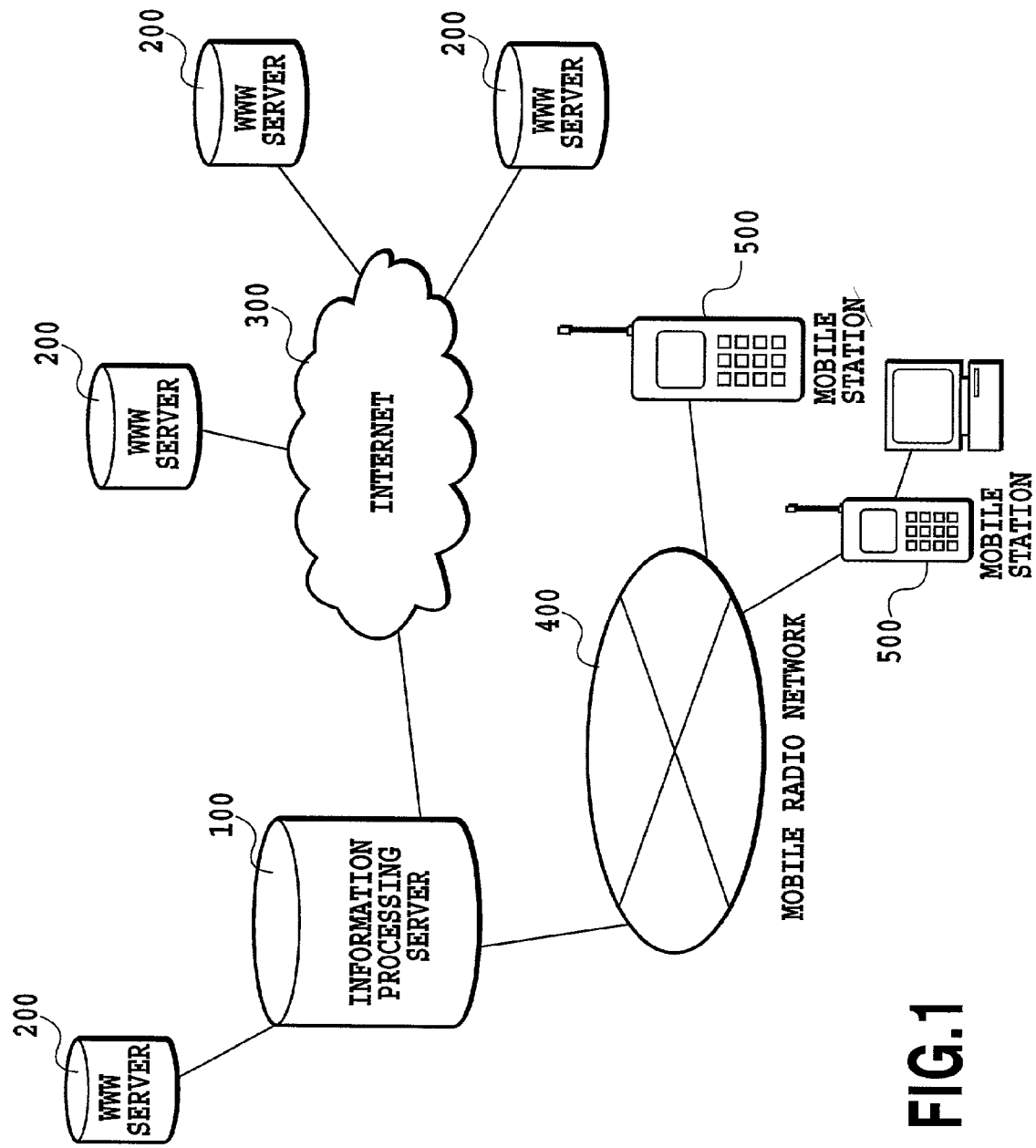
FIG. 1 is a view showing an example of the system configuration of an information providing system to which the present invention is applied.

FIG. 1 is a view showing an example of the system configuration of an information providing system to which the present invention is applied and conceptually showing only those parts of the system configuration of the information system which relate to the present invention.

The information providing system comprises at least an information processing server 100, a WWW server 200, the Internet 300, a mobile radio network 400, and a mobile station 500.

The information process server 100 is connected to the Internet 300 and the mobile radio network 400 and has a function of obtaining information from Web pages from the WWW server 200, processing the information, and transmitting it to the mobile station 500 via the mobile radio network 400. The WWW server 200 is connected to the Internet 300 and has a function of storing information such as Web pages produced by producers and providing the information to third people via the Internet 300. Additionally, the WWW server 200 may be directly connected to the information processing server 100. The Internet 300 is connected to the information processing server 100 and the WWW server 200 and has a function of connecting these servers together. The mobile radio network 400 is connected to the information processing server 100 and has a function of switching circuits or packets under the control of a mobile communication network. The mobile radio network 400 may be, for example, a cellular circuit network based on the existing PDC (Personal Digital Cellular) system or a cellular packet network based on the PDC-P (Personal Digital Cellular-Packet) system which is used in services such as Dopa (service name) provided by NTT DoCoMo (company name). The mobile station 500 has a function of carrying out radio communication with the mobile radio network 400, receiving information from the information processing server 100, and displaying the information. In addition, the mobile station 500 has a personal computer and the like connected thereto. The mobile station 500 has, for example, a 9,600 bit/s packet communication function and a browser (viewing software) installed therein. In this case, the mobile station 500 may be a portable terminal corresponding to, for example, the i mode (the name of a service provided by NTT DoCoMo (company name)). The i mode is a non-audio service provided by NTT DoCoMo (company name) and having an electronic main function and a function of connecting to the Internet. To allow information from Web sites of the Internet to be viewed, i mode portable terminals have microbrowsers installed therein and specialized therefor, due to their insufficient processing capability and memory capacity or limited display size, compared to personal computers.

If a user of the mobile station 500 is to access a desired WWW server 200 to view A Web page, Web page information from the WWW server 200 is processed and converted by the information processing server 100 and then transmitted to the mobile station 500.

Then, an example of information processing and conversion in the information processing server 100 will be described with reference to FIGS. 3A, 3B and 3C.

Figure 3B:
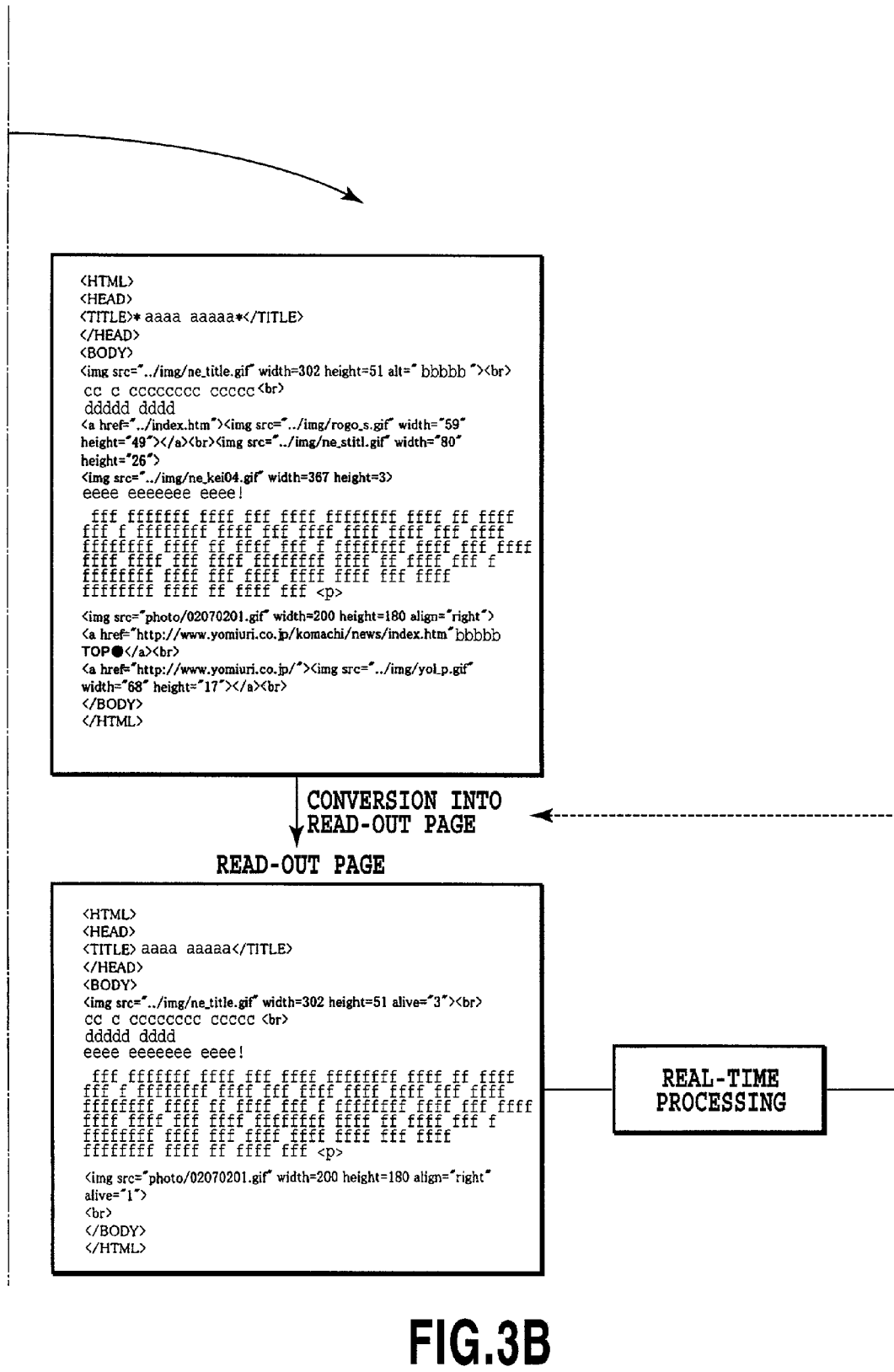

FIGS. 3A, 3B and 3C are views useful in explaining an example of the concept of information processing and conversion according to the present invention.

General Web pages are described in the markup language (for example, the HTML (Hypertext Markup Language) and an expansion markup language of the HTML) format. In the present embodiment, first, a Web page of the HTML format is converted into the compact HTML (cHTML) format using a well-known filtering technique. Further, the cHTML format is converted into a Web page of a format suitable for aural read-out. In this case, particular tags are deleted or added in accordance with specified conditions. A communication terminal receives voice output information obtained by audio conversion (information obtained by converting text data from read-out page into voices as shown in FIGS. 3A, 3B and 3C) and the read-out page and/or image data of a format suitable for aural read-out and obtained by the conversion, and subjects these data to real-time processing for synchronization to display a screen or output voices. Furthermore, the communication terminal may automatically switch the screen display when a specified amount of time has passed (if, for example, tags in the read-out page are used to specify time to display images) or the aural read-out has ended. Thus, the user is relieved from complicated scrolling, and broadcasting services using mobile stations can be provided.

In the above description, Web pages are converted into the format suitable for aural read-out, and text data comprising the information obtained by the conversion are converted into voices, which are then transmitted to the communication terminal. The audio conversion process, however, need not necessarily be mechanically carried out but, for example, the user may read out text data associated with image data (read-out voices may be previously stored in a database) and transmit the image data and associated voices in such a manner that they synchronize with one another on the communication terminal.

Further, another embodiment of processing and conversion in the information processing server 100 will be described in detail.

Text data in information in Web pages may be converted into voice data. Additionally, text data may be converted into small text data with a smaller amount of information (for example, the text data is partly deleted, a summary thereof is created, or indices therefor are created). Further, the small text data may be converted into voice data. Further, image data in the information in the Web pages may be converted into text data representing the images. In addition, the text data may be converted into voice data. Further, the image data may be converted into small image data with a smaller amount of information (for example, the image data have their size reduced using an existing image compression technique). The processing and conversion enables a We page viewer to aurally recognize the page without relying on the visual sense, so that even during movement, the user can easily and safely obtain information as intended by the producer and can be relieved from complicated scrolling despite a small display screen.

Additionally, the processing and conversion may be carried out if the type of a terminal (for example, a PC, a PDA or a mobile station) requesting information is determined to be a specified one (for example, a PDA or a mobile station). Thus, if the requesting terminal is a mobile station and the like, data are automatically processed or converted to eliminate the requirement that the viewer commands the information processing server 100.

Further, the information server 100 may determine the quality of communication with the mobile station 500 to carry out the processing and conversion if the quality is determined to be inappropriate. Thus, particularly in mobile communication, the data are automatically processed or converted depending on the communication quality to eliminate the requirement that the viewer commands the information processing server 100.

Furthermore, the data may be converted into voices to which 4.8-kbps CODEC has been applied, which is applied to mobile communication networks.

Figure 2:
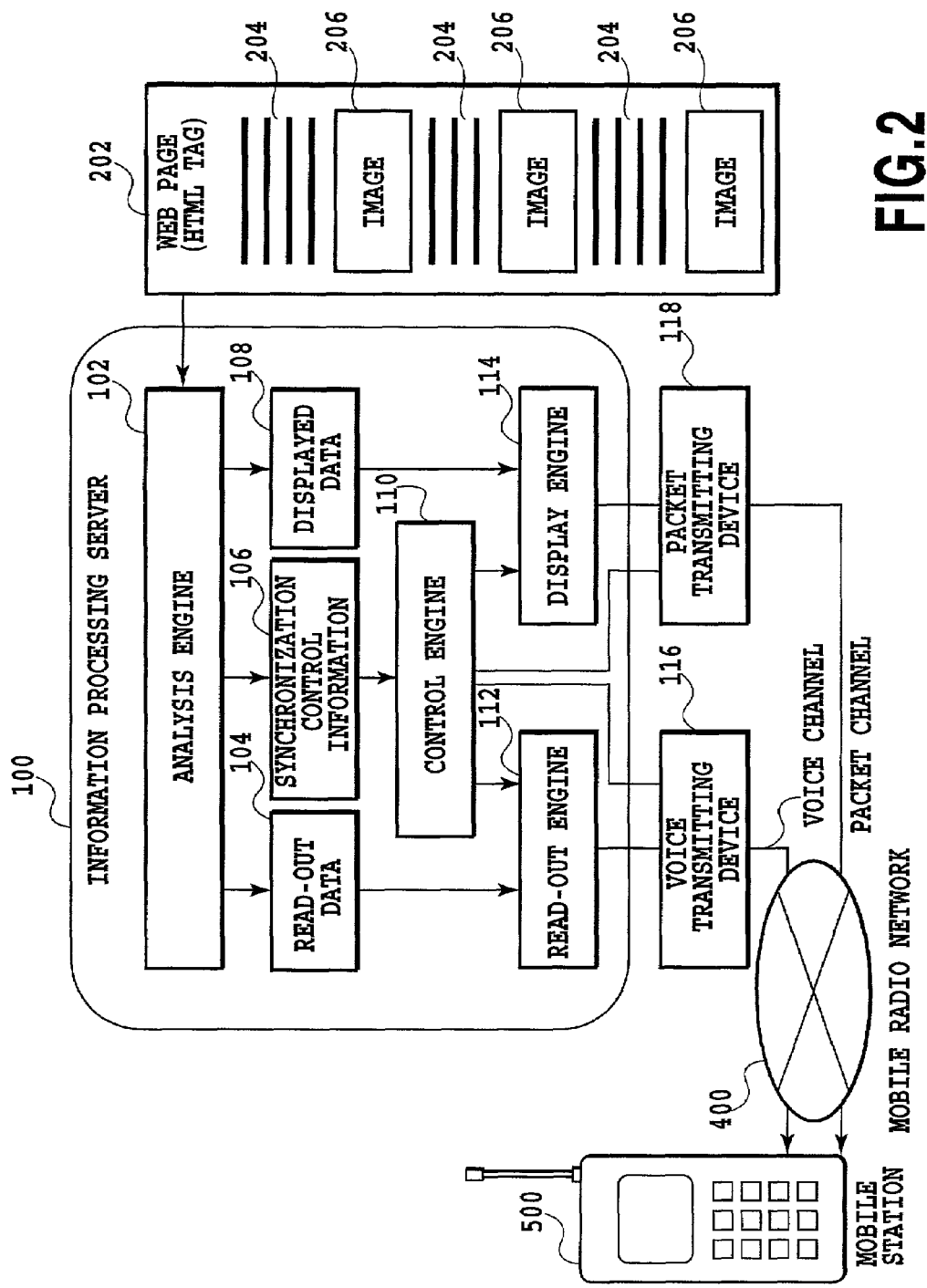
FIG. 2 is a view showing an example of a function blocks of an information processing server.

FIG. 2 is a view showing an example of functional blocks of the information processing server shown in FIG. 1 and conceptually showing only those parts of the function of the information processing server which relate to the present invention.

The information processing server 100 comprises at least an analysis engine 102, a control engine 110, a read-out engine 112, and a display engine 114. The analysis engine 102 is connected to the control engine 110, the read-out engine 112, and the display engine 114, and has a function of analyzing Web pages 202 received from the WWW server 200. If the Web page 202 contains text data 204 and image data 206, the text data 204 are extracted as read-out data 104 and transmitted to the read-out engine 112, while the image data 206 are extracted as displayed data 108 and transmitted to the display engine 114. Then, synchronization control information 106 for synchronizing the text data 204 with the image data 206 on a display screen is created and transmitted to the control engine 110. The control engine 110 is connected to the analysis engine 102, the read-out engine 112, the display engine 114, a voice transmitting device 116, and a packet transmitting device 118, and has a function of controlling the operations of the read-out engine 112 and the display engine 114 based synchronization control information received from the analysis engine 102. The read-out engine 112 is connected to the analysis engine 102, the control engine 110, and the voice transmitting device 116, and has a function of processing and converting the read-out data 104 received from the analysis engine 102 into voice data under the control of the control engine 110. The display engine 114 is connected to the analysis engine 102, the control engine 110, and the packet transmitting device 118, and has a function of processing and converting the displayed data 108 received from the analysis engine 102 into packet data under the control of the control engine 110. The voice transmitting device 116 is connected to the control engine 110 and the read-out engine 112 and has a function of transmitting voice data generated by the read-out engine 112, to the mobile station 500 via a voice channel of the mobile radio network 400. The packet transmitting device 118 is connected to the control engine 110 and the display engine 114, and has a function of transmitting packet data generated by the display engine 114, to the mobile station 500 via a packet channel of the mobile radio network 400. In addition, the synchronization control information 106 may be transmitted from the control engine directly to the voice transmitting device 116 or the packet transmitting device 118. In this case, the voice and packet channels may use a multicall function based on the IMT-2000 system. Accordingly, the plurality of channels may be simultaneously used to provide high-quality information. The voice transmitting device 116 and the packet transmitting device 118 divides data before transmission to ascertain that each divided transmission is normal. If the transmission is normal, the next divided transmission is executed, whereas if it is abnormal, the data may be retransmitted. This makes the data continuous so that the data can be displayed as intended by the Web page producer despite a low communication quality.

Figure 4:
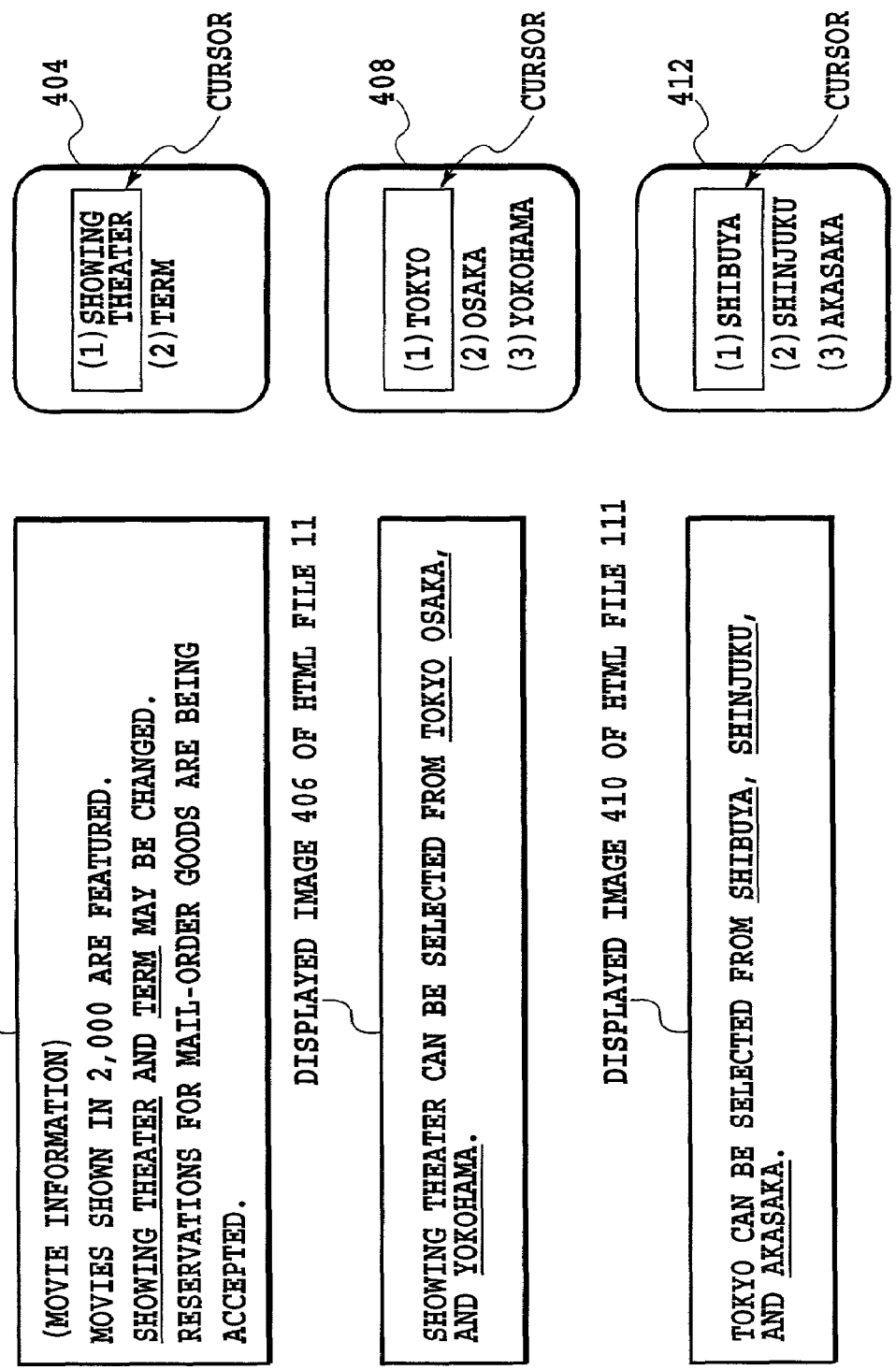
FIG. 4 is an image drawing showing an outline of an information distributing method according to a first embodiment of the present invention in which anchor information comprising important words is embedded in an HTML text.

FIG. 4 is an image drawing showing an outline of an information distributing method according to this embodiment in which anchor information comprising important words is embedded in an HTML text.

FIG. 4 will be explained by taking as an example a case where an HTML file 1 (402 in FIG. 4) is transmitted from the WWW server 200 to the mobile station 500 through the information processing server 100.

First, on receiving the HTML file 1 from the WWW server 200 via the Internet 300, the information processing server 100 causes the analysis engine 102 to analyze tags in the HTML file 1 to generate the read-out data 104 containing a text, the displayed data 108 containing anchor information with its links set in another HTML file, and the synchronization control information 106 for synchronizing the read-out data 104 with the displayed data 108. That is, the analysis engine 102 determines from the HTML tags that the anchor information in the HTML file 1 comprises a "showing theater" and a "term", to generate the displayed data 108 containing the "showing theater" and the "term". In addition, the analysis engine 102 determines a text portion ("movie information: featuring movies shown in 2,000. The showing theater and term may be changed. applications for mail-order goods are being accepted") of the HTML file 1 from the HTLM flag to generate the read-out data 104 containing it. In addition, while the read-out data 104 are being read out loud, the analysis engine 102 generates the synchronization control information 106 so that the displayed data 108 are displayed on the screen.

Then, the read-out engine 112 of the information processing server 100 converts the read-out data 104 into voice data and transmits the latter to the voice transmitting device 116, which then transmits the read-out data 104 to the mobile station 500 via the mobile radio network 400.

Then, the display engine 114 of the information processing server 100 converts the displayed data 108 into packet data and transmits the latter to the packet transmitting device 118, which then transmits the displayed data 108 to the mobile station 500 via the mobile radio network 400.

At this point, the control engine 110 of the information processing server 100 provides control based on the synchronization control information 106 in such a manner that the read-out data 104 and the displayed data 108 are synchronously transmitted to the mobile station 500.

Then, the mobile station 500 outputs the received voice data as voices, while converting the received packet data into the displayed data 108 for display on the screen. Images then displayed on the screen of the mobile station 500 are shown in FIG. 4 at 404.

Then, the user selects from the anchor information ("showing theater" and "term") displayed on the screen, by using operation buttons and the like of the mobile station 500 to move a cursor. When one piece of the anchor information is selected, the next HTML document to be transmitted to the mobile station 500 is identified in accordance with link information (the URL address of another HTML file and the like) specified by the anchor information and an existing hyper text technique and the like is used to transmit the HTML file from the WWW server 200 to the information processing server 100.

For example, at 404 in FIG. 4, when link information indicating the address of an HTML file 11 is set in the "(1) showing theater" in the anchor information displayed on the screen and if the user selects the "(1) showing theater", the HTML file 11 is transmitted from the WWW server 200 to the information processing server 100.

Then, on receiving the HTML file 11 (406 in FIG. 4) from the WWW server 200 via the Internet 300, the information processing server 100 causes the analysis engine 102 to analyze tags in the HTML file 1 to generate the read-out data 104, the displayed data 108 containing anchor information with its links set in another HTML file, and the synchronization control information 106 for synchronizing the read-out data 104 with the displayed data 108. That is, the analysis engine 102 determines from the HTML tags that the anchor information in the HTML file 1 comprises "Tokyo", "Osaka", and "Yokohama", to generate the displayed data 108 containing "Tokyo", "Osaka", and "Yokohama". The analysis engine 102 also determines a text portion ("the showing theater can be selected from Tokyo, Osaka, and Yokohama") of the HTML file 1 from the HTML tags to generate the read-out data 104 containing the text portion. In addition, while the read-out data 104 are being read out loud, the analysis engine 102 generates the synchronization control information 106 so that the displayed data 108 are displayed on the screen.

Then, the read-out engine 112 of the information processing server 100 converts the read-out data 104 into voice data and transmits the latter to the voice transmitting device 116, which then transmits the read-out data 104 to the mobile station 500 via the mobile radio network 400.

Then, the display engine 114 of the information processing server 100 converts the displayed data 108 into packet data and transmits the latter to the packet transmitting device 118, which then transmits the displayed data 108 to the mobile station 500 via the mobile radio network 400.

At this point, the control engine 110 of the information processing server 100 provides control based on the synchronization control information 106 in such a manner that the read-out data 104 and the displayed data 108 are synchronously transmitted to the mobile station 500.

Then, the mobile station 500 outputs the received voice data as voices, while converting the received packet data into the displayed data 108 for display on the screen. Images then displayed on the screen of the mobile station 500 are shown in FIG. 4 at 408.

Then, the user selects from the anchor information ("Tokyo", "Osaka" and "Yokohama") displayed on the screen, by using the operation buttons and the like of the mobile station 500 to move the cursor. When one piece of the anchor information is selected, the next HTML document to be transmitted to the mobile station 500 is identified in accordance with link information (the URL address of another HTML file and the like) specified by the anchor information and an existing hyper text technique is used to transmit the HTML file from the WWW server 200 to the information processing server 100.

For example, at 408 in FIG. 4, when link information indicating the address of an HTML file 111 is set in the "(1) Tokyo" in the anchor information displayed on the screen and if the user selects the "(1) Tokyo", the HTML file 111 is transmitted from the WWW server 200 to the information processing server 100.

Then, on receiving the HTML file 111 (410 in FIG. 4) from the WWW server 200 via the Internet 300, the information processing server 100 causes the analysis engine 102 to analyze tags in the HTML file 1 to generate the read-out data 104, the displayed data 108 containing anchor information with its links set in another HTML file, and the synchronization control information 106 for synchronizing the read-out data 104 with the displayed data 108. Then, the analysis engine 102 determines from the HTML tags that the anchor information in the HTML file 1 comprises "Shibuya", "Shinjuku", and "Akasaka", to generate the displayed data 108 containing "Shibuya", "Shinjuku", and "Akasaka". The analysis engine 102 also determines a text portion "Tokyo can be selected from Shibuya, Shinjuku, and Akasaka") of the HTML file 1 from the HTML tags to generate the read-out data 104 containing the text portion. In addition, while the read-out data 104 are being read out loud, the analysis engine 102 generates the synchronization control information 106 so that the displayed data 108 are displayed on the screen.

Then, the read-out engine 112 of the information processing server 100 converts the read-out data 104 into voice data and transmits the latter to the voice transmitting device 116, which then transmits the read-out data 104 to the mobile station 500 via the mobile radio network 400.

Then, the display engine 114 of the information processing server 100 converts the displayed data 108 into packet data and transmits the latter to the packet transmitting device 118, which then transmits the displayed data 108 to the mobile station 500 via the mobile radio network 400.

At this point, the control engine 110 of the information processing server 100 provides control based on the synchronization control information 106 in such a manner that the read-out data 104 and the displayed data 108 are synchronously transmitted to the mobile station 500.

Then, the mobile station 500 outputs the received voice data as voices, while converting the received packet data into the displayed data 108 for display on the screen. Images then displayed on the screen of the mobile station 500 are shown in FIG. 4 at 412.

Then, the user selects from the anchor information ("Shibuya", "shinjuku" and "Akasaka") displayed on the screen, by using the operation buttons and the like of the mobile station 500 to move the cursor. When one piece of the anchor information is selected, the next HTML document to be transmitted to the mobile station 500 is identified in accordance with link information (the URL address of another HTML file and the like) specified by the anchor information and an existing hyper text technique is used to transmit the HTML file from the WWW server 200 to the information processing server 100.

Thus, the anchor information can be embedded in the text that will be a source of aural read-out so that this information can be displayed on the display in synchronism with the read-out of the anchor information comprising important words. Consequently, the displayed anchor information can be used to allow the user to hierarchically view and listen to information.

Additionally, a hierarchical information-viewing method using the hyper text technique and the like and which has been only implemented using text information can be easily introduced into a voice information listening system.

Further, the user, listening to voice information for read-out data, can easily access that of the read-out voice information which the user desires to know in further detail.

This embodiment has been described taking by way of example the case where the information processing server 100 converts the read-out data 104 into voice data and transmits the latter to the mobile station 500, but the present invention is not limited to such a case and the information processing device 100 may transmit the read-out data 104 while the mobile station 500 may convert the read-out data into voice data for voice output. Thus, due to their data size smaller than that of the voice data, generally comprising binary data, the read-out data 104, generally comprising text data, serve to improve the efficiency of traffic between the information processing server 100 and the mobile station 500.

The present embodiment has been described taking by way of example the case where the HTML is used as a markup language, but an expansion markup language of the HTML or another markup language can be used in place of the HTML or together with the HTML.

(Additional Service)

In addition to the above described functions, the information processing server may have the following additional services:

(1) Timer Function

When a point of time specified by the user has come, the mobile station 500 is automatically activated to access the specified WWW server 200 to automatically read out the contents. A plurality of points of time may also be registered in a timer.

(2) Read-out Page Save Function

When the user specifies a point of time or data required to save a URL and the like, the information processing server 100 accesses the WWW server 200 to save information. When the user accesses the information processing server 100 at an arbitrary point of time after the specified point of time, the contents are read out loud.

(3) Program Organizing Function

The user organizes a schedule for viewing the contents of desired Web pages like a TV program schedule and transmit the schedule to the WWW server 200. The WWW server 200 then transmits information to the mobile station 500 in accordance with this schedule using functions such as timer reception and read-out page saving.

(4) Update Catch Function This function checks whether or not the WWW server 200 with a user specified URL has been updated. The information processing server 100 may check whether or not the WWW server 200 has been updated, every specified amount of time or a service may be used in which the WWW server 200 notifies registered members of an update if any. In this case, if the server has been updated, the information processing server 100 may notify the mobile station 500 of the update by mail or save updated contents to the information processing server 100 or the mobile station 500 may be automatically activated to start read-out.

(5) Skip Function

While reading data, the user moves through the data faster by skipping paragraphs or chapters.

(6) Imitation Sound and Effective Sound Function

If particular symbols or marks are described in Web pages, sound data corresponding to them are inserted.

(7) Voice Command Function

The user can control the read-out by inputting a voice command and without operating buttons and the like of the mobile station 500. The user can execute, for example, a URL or page skip operation or a phone-to operation.

(8) Multiple Languages Translation Function

The text for aural read-out is automatically translated into multiple languages, and underwent voice synthesis and is read out in the multiple languages.

Other Embodiments

The above described embodiment has been described taking by way of example the case where the information processing server 100 is used, but the present invention is not limited to this case. It is obvious to those skilled in the art that the present invention can be attained by implementing any function of the information processing server 100 in the WWW server 200, the mobile radio network 400, or the mobile station 500.

Additionally, the above described embodiment has been described taking by way of example the case where the mobile communication system is used, but the present invention is not limited to this case. In other embodiments, a fixed telephone network, the Intranet, or a LAN may be used and the communication terminal may comprise a personal computer, a PDA, and the like.

Further, the above described embodiment has been described taking by way of example the case where the information processing server 100, the voice transmitting device 116, and the packet transmitting device 118 are implemented as independent enclosures, but the present invention is not limited to this case. In other embodiments, it is obvious to those skilled in the art that any of these devices may be combined together into one enclosure.

Furthermore, the above described embodiment has been described taking by way of example the case where the information processing server 100 and the WWW server 200 are implemented as independent enclosures, but the present invention is not limited to this case. It is obvious to those skilled in the art that in other embodiments, these servers may be combined together into one enclosure.

Moreover, the above described embodiment has been described taking the service, system, and others of NTT DoCoMo (company name) by way of example, but the present invention is not limited to this case. In other embodiments, the present invention may be applied to services, systems, and the like of other companies which have similar functions.

Furthermore, the above described embodiment has been described taking by way of example the case where the WWW server 200 is connected via the Internet 300, but the present invention is not limited to this case. In other embodiments, the WWW server 200 may be connected directly to the information processing server 100.

As described above in detail, according to the present invention, accompanying information such as text information can be converted into voice information as appropriate so that Web pages can be displayed on the screen while voices can be output therefrom, as intended by the producer. Additionally, voice information can be obtained from a desired Web page.

In addition, according to the present invention, Web pages with synchronized voices and images can be displayed, and program broadcasting is possible on the mobile station.

Further, according to the present invention, data can be transmitted more efficiently.

Furthermore, according to the present invention, what is called PULL type information-distributing services can be efficiently executed.

Moreover, according to the present invention, broadcasting or program broadcasting can be efficiently carried out for a plurality of users, thereby enabling what is called PUSH type information-distributing services to be efficiently executed.

Further, according to the present invention, the convention operation on the mobile station can be simplified.

Furthermore, the anchor information can be embedded in the text that will be a source of aural read-out so that this information can be displayed on the display in synchronism with the read-out of the anchor information comprising important words. Consequently, the displayed anchor information can be used to allow the user to hierarchically view and listen to information.

Additionally, a hierarchical information-viewing method using the hyper text technique and the like and which has been only implemented using text information can be easily introduced into a voice information listening system.

Further, the user, listening to voice information for read-out data, can easily access that of the read-out voice information which the user desires to know in further detail.

Second Embodiment

The second embodiment of the present invention will be described.

Figure 5:
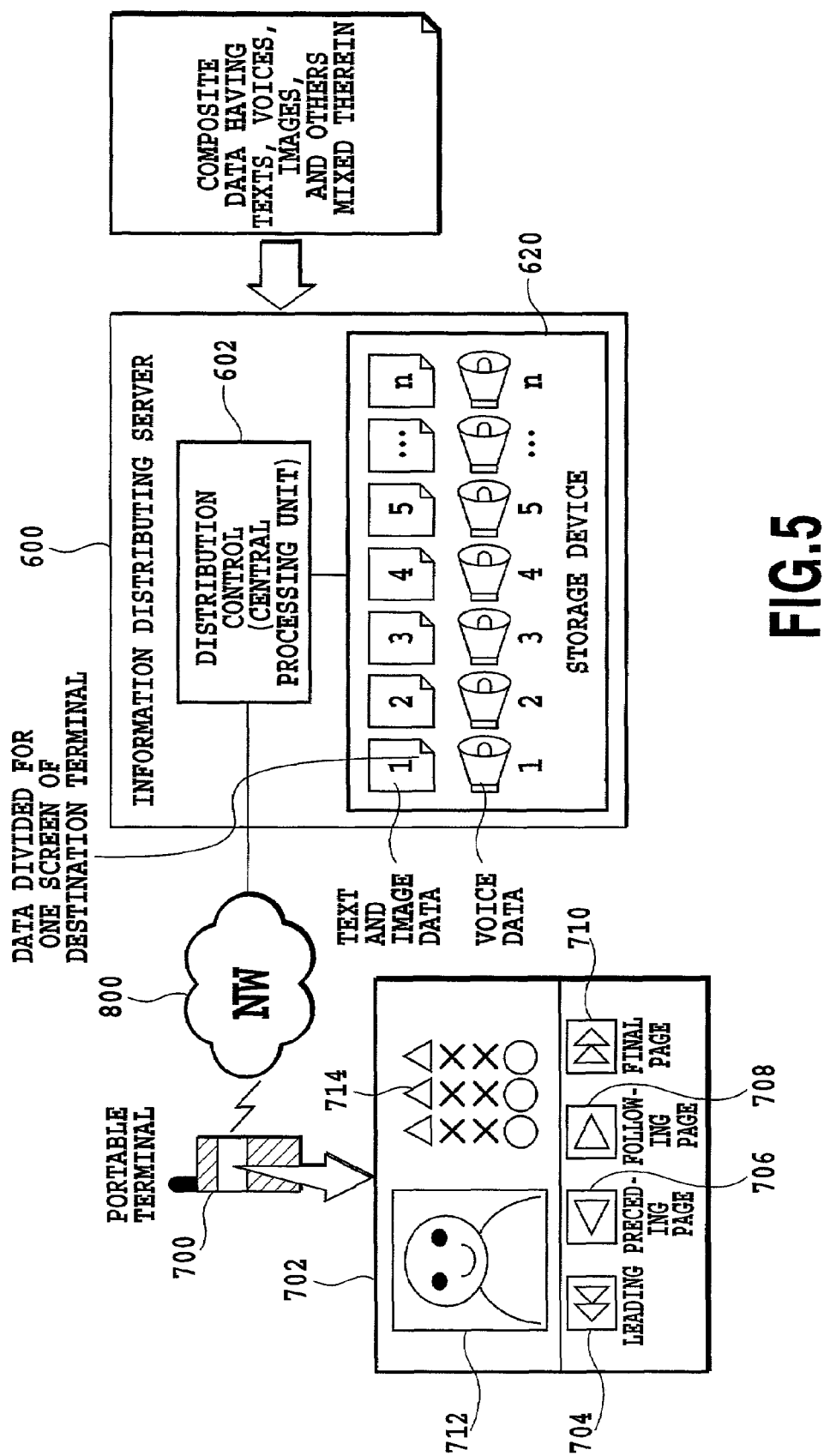
FIG. 5 is a view showing an example of the system configuration of an information distributing system to which the present invention is applied.

FIG. 5 is a view showing an example of the system configuration to which the present invention is applied and conceptually showing only those parts of the configuration of this system which relate to the present invention.

The information distributing system comprises at least a portable terminal 700 for receiving a content, an information distributing server 600 for providing the portable terminal 700 with a content received from a content server (not shown) and the like which stores various contents, and a communication network 800 for connecting the portable terminal 700 and the information distributing server 600 together.

The information distributing server 600 provides various contents received from the content server and the like to the portable terminal 700 via different communication channels. For example, voice data are provided via a voice circuit channel, while image data are provided via a packet channel. In this case, a central processing unit (a control means; hereafter referred to as a "CPU") 602 responsible for controlling distributions from the information distributing server 600 has a function of providing a service that sets as one set a group of different data corresponding to one content to divide a group of data comprising different types of continuous data into page files for the group of data each of which can be displayed in one screen of the portable terminal so that search, skip, rewind, page navigation, and the like can be controlled based on link information for the page files obtained by the division.

The portable terminal 700 is a known PHS terminal, cellular telephone terminal, mobile communication terminal, or information processing terminal such as a PDA with a mobile communication function; it may be realized by implementing software (containing a program, data, and the like) and the like in the above terminal, the software enabling Web information to be browsed. In particular, the portable terminal may have an electronic mail function or a function of accessing the Internet (for example, the i mode (service name) terminal provided by NTT DoCoMo (company name)).

The content server (not shown) has functions of storing various contents and providing contents to third people; it may be realized as a WEB server or an ASP server.

The communication network 800 has a function of connecting the information distributing server 600, the portable terminal 700, and the content server together. It may include any of the Internet, the Intranet, a LAN (including both wired and radio networks), the VAN, a public telephone network (including both analog and digital networks), the CATV network, a cellular circuit switching network/cellular packet switching network based on the PDC/PDC-P system, the IMT 2000 system, and the like, a radio call network, a local radio network, a PHS network, a satellite communication network, and others.

An example of the configuration of a mobile communication network system according to this embodiment configured as described above will be described with reference to FIG. 5.

In FIG. 5, by way of example, a Web information service and the like of the Internet and the like is used to transmit a content stored in the content server to the portable terminal via the information distributing server 600 in such a manner that data such as images are transmitted by means of packet communication while voice information is transmitted in the form of speech. In this case, the portable terminal 700 may request the content from the content server (PULL type information distribution), or conversely, the content server may automatically distribute the content to the portable terminal 700 (PUSH type information distribution). The information distributing server 600 is requested by the portable terminal 700 or the content server to transmit the content, and provide various contents received from the content server to the portable terminal 700 using different communication channels. Additionally, the portable terminal 700 may request a content directly from the information distributing server 600, which may then request the content from the content server using a background process.

The CPU 602 of the information distributing server 600 creates page files by setting as one page, a set of composite data that can be displayed in one display screen of the portable terminal 700 and then stores them in a storage device 620. In this case, for the data that can be displayed on one display screen of the portable terminal 700, information such as the maximum number of characters displayed and the maximum number of dots displayed may be obtained beforehand from the individual terminals 700, or the standard number of characters displayed, the standard number of dots displayed, and the like may be recorded in the storage device 620 as default values. In addition, index information (for example, URL information for all created pages) for contents is created. Then, text and image data and voice data are synchronously transmitted to the portable terminal 700 via the communication network 800 for each page. Additionally, index information for the content is transmitted together.

The user of the portable terminal 700 can view image data 712 and text data 714 displayed for each page, while listening to corresponding voice data from speakers.

In addition, when the user activates a button 704 for returning to the leading page, a button 706 for returning to the preceding page, a button 708 for proceeding to the next page, or a button 710 for proceeding to the final page by operating corresponding keys of the portable terminal, the received index information is accessed and control data (for example, URL information corresponding to the relevant page) corresponding to the buttons are transmitted from the portable terminal 700 to the information distributing server 600. Then, the CPU 602 of the information distributing server 600 reads data for the corresponding page out from the storage device 620 based on the received control data and transmits them to the portable terminal 700.

Figure 6:
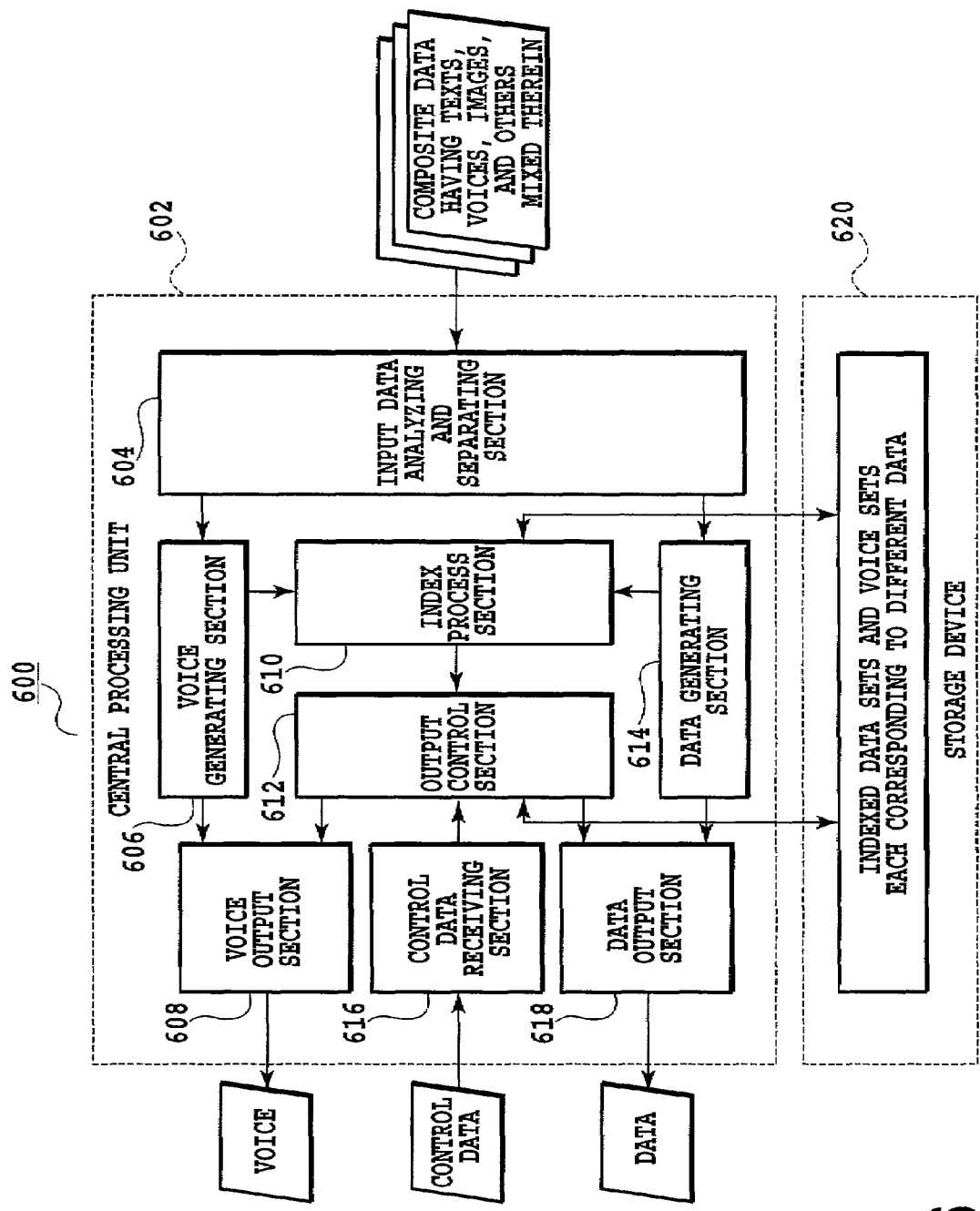
FIG. 6 is a view showing an example of the configuration of an information distributing server to which the present invention is applied.

FIG. 6 is a view showing an example of the configuration of the information processing server 600 to which the present invention is applied and conceptually showing only those parts of the configuration which relate to the present invention.

The information distributing server 600 according to the present invention comprises at least the programmed CPU 602 for integrally controlling the entire system, and the storage device 620, a communication interface (not shown) connected to a communication device such as a modem, a terminal adapter, a DSU, or a router connected to a communication circuit (including wired/radio, LAN/Internet, and analog/digital circuits) and the like, an input device comprising a pointing device such as a mouse, a keyboard, an image scanner, or a digitizer, a display device (not shown) used to monitor input data, and an output device (not shown) such as a printer which outputs various processing results and other data, which devices are all connected to the CPU 602 via a bus. In addition, the input device, the display device, and the output device may each be connected to the CPU 602 via an I/O interface (not shown). The CPU 602 has an internal memory for storing a control program such as an OS (Operating System), programs defining various process procedures, and required data so that these programs and others can be used to carry out information processing for executing various processes. The storage device 620 is a memory device such as a RAM or a ROM, a fixed disc device such as a hard disk, or a storage means such as a flexible disk or an optical disk and stores various tables, files, databases, and others which are used for various processes; it stores at least data and voices divided for each page and index information therefor. Since the input device such as a mouse, a keyboard, or an image scanner, the display device, and the output device such as a printer device are used by a maintainer to maintain and monitor the information distributing server 600, these devices are not required for the configuration of the information distributing server 600. The communication interface has a function of communicating data with another terminal via a communication circuit. The information distributing server 600 may be configured as an arbitrary exchange, a WEB or ASP server, and the like in the network, and its hardware may be configured using an information processing apparatus such as a commercially available workstation or personal computer as well as its attached devices.

In FIG. 6, each block in the CPU 602 shows an example of a block for a function executed by the CPU 602; this figure conceptually shows only those parts of the function of the CPU 602 that relate to the present invention. The functional blocks described herein are implemented by programs and the like executed by the CPU 602 shown in the view of the hardware configuration of the information distributing server 600 described in FIG. 6.

The CPU 602 comprises at least an input data analyzing and separating section 604 for analyzing a content received from the content server, that is, composite data comprising a mixture of data such as voices and images, a voice generating section 606 for generating voices from a voice portion of the content, a voice output section 608 for outputting the generated voices to the portable terminal 700 via a voice circuit channel, a data generating section 614 for generating data other than the voices from a data portion of the content, a data output section 618 for outputting the generated data to the portable terminal 700 via a packet channel, an index processing section 610 for storing in the storage device 120, data sets and voice sets corresponding to each data obtained by dividing the voices and data for each page and applying indices to the divided voices and data, an output control section 612 for reading out the data and voice sets stored in the storage device 620 to control voice and data outputs, and a control data receiving section 616 for receiving control data from the portable terminal 700.

Next, an example of the operation of the information distributing server 600 according to this embodiment configured as described above will be explained below in detail.

First, the input data analyzing and separating section 604 obtains each set of a content received from the content server, that is, composite data comprising a mixture of data such as voices and images, and analyzes the group of these data and separates them into a voice portion and a data portion other than the voices. In reading text data out loud, the text data may be contained in the voice portion.

Then, the voice generating section 606 generates appropriate voices for the separated voice portion. If the voice portion contains text data, voices are generated by means of voice synthesis and the like. Additionally, the data generating section 614 edits the separated data portion so that it can be appropriately displayed in the portable terminal 700, to generate image data and the like.

Then, the index processing section 610 divides the data into pieces of a size equal to one page on the display screen of the portable terminal 700, to generate data sets, and creates a voice set corresponding to each of the data sets. The index processing section 610 then creates index information for the divided data and voices and stores them in the storage device 620. Images are stored in the storage device 620 in such a manner that the divided text and image data correspond to the corresponding voice data, as shown in FIG. 5.

Then, the output control section 612 controls outputs from the voice output section 608 and data output section 618 based on the data and voice sets stored in the storage device 620, and the voice output section 608 and the data output section 618 output voices and data, respectively, to the portable terminal 700 using different channels. At this point, data index information, for example, information indicating the first, preceding, following, and last pages of the provided content (for example, information such as URLs which indicates addresses is transmitted).

Then, it is determined whether or not all the data sets have been output, and if there remains a next data set to output, that is, the next data set to output which has been received from the content server, the process returns to its beginning.

Thus, a group of data comprising different types of continuous data can be separated into data each of which is small enough to be displayed in one screen and can then be sequentially distributed to the portable terminal 700, with which the user can comfortably reference each page of the content.

Next, an example of the operation of the information distributing server 600 performed if the user of the portable terminal 700 transmits control data in this embodiment configured as described above will be described in detail.

When the user, viewing or listening to Web information (voices, images, and text data) received from the information distributing server 600, activates the button 704 for returning to the leading page, the button 706 for returning to the preceding page, the button 708 for proceeding to the next page, or the button 710 for proceeding to the final page by operating corresponding keys of the portable terminal, as shown in FIG. 5, and control data corresponding to the buttons are transmitted from the portable terminal 700 to the information distributing server 600 based on the index information. In the following embodiment, a case where control data comprise URLs indicating addresses at which the pages are stored will be explained as an example.

Figure 7:
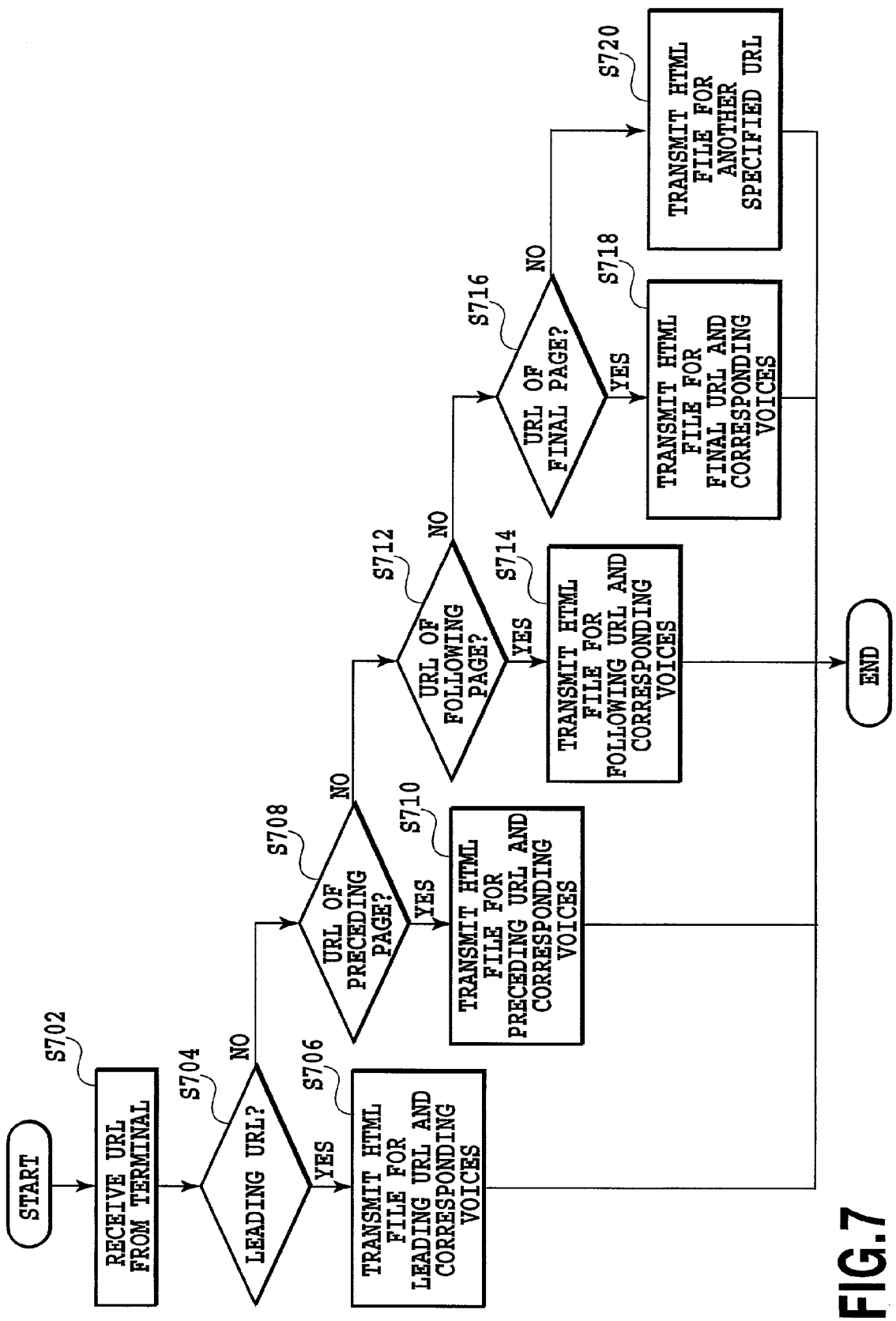
FIG. 7 is a flow chart useful in explaining an example of the operation of an information distributing server according to a second embodiment of the present invention.

FIG. 7 is a flow chart useful in explaining an example of the operation of the information distributing server 600 according to this embodiment.

First, a control data receiving section 616 of the information distributing server 600 receives URLs from the portable terminal 700 (step 702). The URLs have been transmitted from the information distributing server 600 to the portable terminal 700 and correspond to button 704 for returning to the leading page, the button 706 for returning to the preceding page, the button 708 for proceeding to the next page, or the button 710 for proceeding to the final page by operating corresponding keys of the portable terminal. When the user specifies one of the buttons, the URL corresponding to the specified button is transmitted to the information distributing server 600 based on the index information transmitted to the portable terminal 700.

Then, the URL is transmitted from the control data receiving section 616 of the information distributing server 600 to the output control section 612, and it is determined which UTR it is, referencing the storage device 620 (steps S704, S708, S712, S716, and S720).

Then, the output control section 612 controls the voice output section 608 and the data output section 618 so that a data set for the URL and a voice set corresponding to the data set are extracted from the storage device 620 and transmitted to the portable terminal 700.

Thus, the information distributing server 600 reads data for the page out from the storage device 620 based on the received control data and transmits them to the portable terminal 700.

Other Embodiments

The above described embodiment has been described taking the mobile communication network by way of example, but the present invention is not limited to this case but is applicable to a satellite communication network, a fixed telephone network, and the like.

Additionally, the above described embodiment has been described taking by way of example the case where the information distributing server 600 is installed outside the communication network 800, but the present invention is not limited to this case. It is obvious to those skilled in the art that the present invention can be implemented whether the information distributing server 600 is installed inside (if it is implemented as an exchange, a network control device, and the like) or outside the network, as long as it is used in the present invention.

Additionally, the above described embodiment has been described taking by way of example the case where the information distributing server 600 and the content server are implemented as independent configurations, but the present invention is not limited to this case. It is obvious to those skilled in the art that in other embodiments, these servers may be configured and implemented by combining them together.

In addition, the data communication system may be either a circuit switching system or a packet switching system.

Further, the above described embodiment has been described taking by way of example the case where it is independently implemented, but the present invention is not limited to this case. It is obvious to those skilled in the art that other embodiments can be combined together as appropriate.

Further, the above described embodiment has been described taking the service, system, and the like of NTT DoCoMo (company name) by way of example, but the present invention is not limited to this case. In other embodiments, the present invention may be applied to services, systems, and the like of other companies which have similar functions.

Furthermore, in the above described embodiment, the information distributing server 600 provides information to the portable terminal 700 using a technique for browsing a display on a Web page, but the information may be transmitted and received using electronic mails or other well-known communication methods, or other communication equipment, for example, telephones or facsimile terminal equipment. The communication form may comprise a communication method other than the Internet.

Various variations other than the above described forms are possible. These variations, however, fall within the technical range of the present invention as long as they are based on technical concepts described in the claims.

As described above in detail, according to the present invention, the information distributing server divides each page of a content received from the content server into data and voices corresponding to the data. The information distributing server then creates data index information. The voices, data, and index information are transmitted from the information distributing server to the portable terminal via the separate communication channels. Thus, services can be provided which divide a group of data comprising different types of continuous data into files of data each of which can be displayed in one screen of the portable terminal and which control search, skip, rewind, page navigation, and the like based on index information for the files obtained by the division.

Third Embodiment

The third embodiment of the present invention will be described below.

Figure 8:
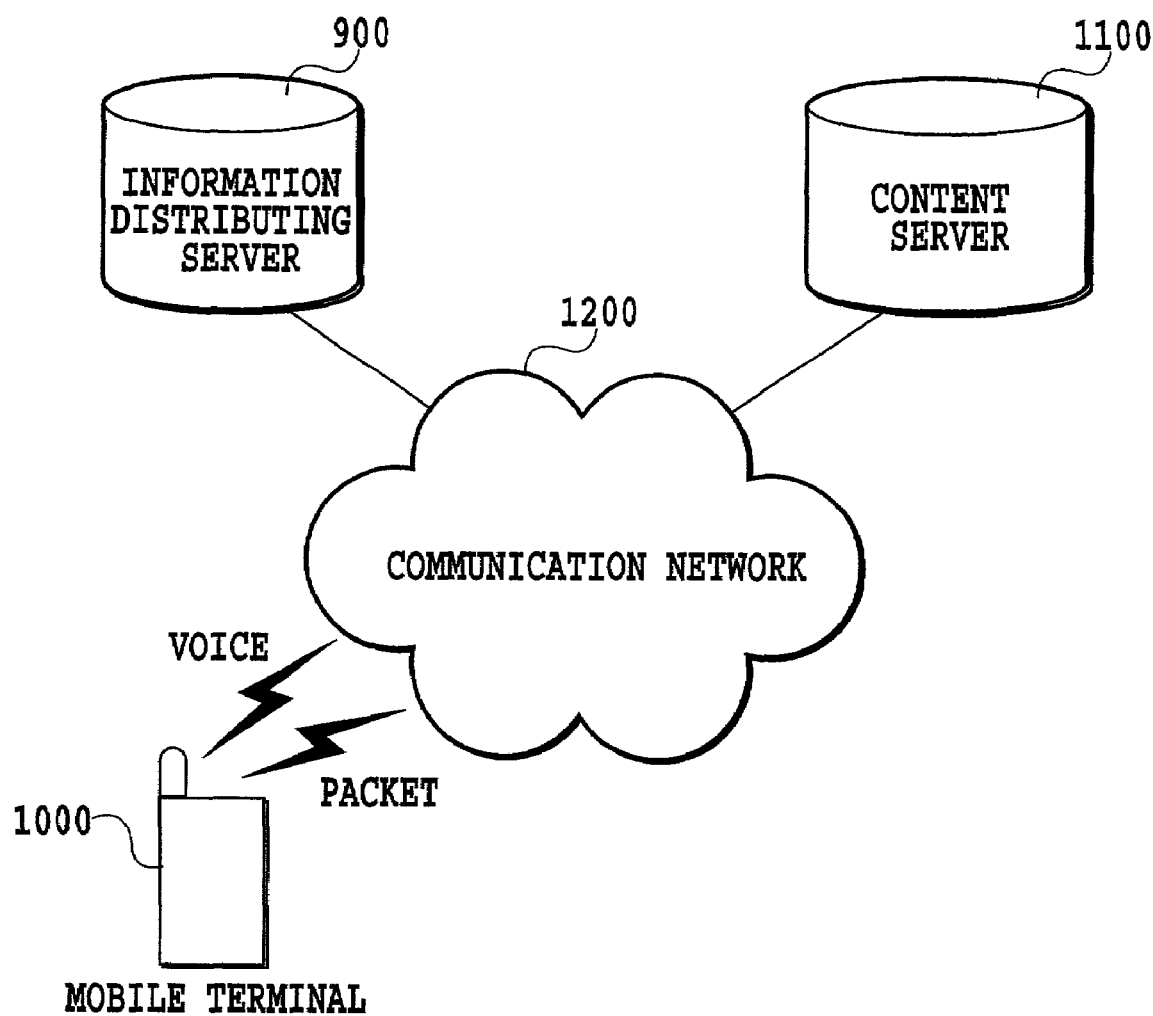
FIG. 8 is a view showing an example of the system configuration of an information distributing system to which the present invention is applied.

FIG. 8 is a view showing an example of the configuration of an information distributing system to which the present invention is applied and conceptually showing only those parts of the configuration of this system which relate to the present invention.

The information distributing system comprises at least a content server 1100 for storing various contents, a mobile terminal 1000 for receiving a content, an information distributing server 900 for providing the content received from the content server 100 to the mobile terminal 1000, and a communication network 1200 for connecting these devices together.

The information distributing server 900 provides various contents received from the content server 1100 to the portable terminal 1000 using different communication channels. For example, voice data are provided through a voice circuit channel, whereas image data are provided through a packet channel. In this case, a group of different types of data corresponding to one content are set as one set, and the amount of time required to transmit one of the data which requires the largest amount of time for transmission is calculated. Based on the calculated amount of time, the mobile terminal 1000 sequentially distributes a group of data comprising different types of continuous data to the mobile terminal 1000, which can thus reference the content without being conscious of synchronization of the set of the group of data.

The mobile terminal 1000 is a known PHS terminal, cellular telephone terminal, mobile communication terminal, or information processing terminal such as a PDA with a mobile communication function; it may be realized by implementing software (containing a program, data, and the like) and the like in the above terminal, the software enabling Web information to be browsed. In particular, the portable terminal may have an electronic mail function or a function of accessing the Internet (for example, the i mode (service name) terminal provided by NTT DoCoMo (company name)).

The content server 1100 has functions of storing various contents and providing contents to third people; it may be realized as a WEB server or an ASP server.

The communication network 1200 has a function of connecting the information distributing server 900, the portable terminal 1000, and the content server 1100 together. It may include any of the Internet, the Intranet, a LAN (including both wired and radio networks), the VAN, a public telephone network (including both analog and digital networks), the CATV network, a cellular circuit switching network/cellular packet switching network based on the PDC/PDC-P system, the IMT 2000 system, and the like, a radio call network, a local radio network, a PHS network, a satellite communication network, and others.

An example of the configuration of a mobile communication network system according to this embodiment configured as described above will be described with reference to FIG. 8.

In FIG. 8, by way of example, a Web information service and the like of the Internet and the like is used to transmit a content stored in the content server 1100 to the portable terminal 1000 via the information distributing server 900 in such a manner that data such as images are transmitted by means of packet communication while voice information is transmitted in the form of speech. In this case, the portable terminal 1100 may request the content from the content server 1100 (PULL type information distribution), or conversely, the content server 1100 may automatically distribute the content to the portable terminal 1000 (PUSH type information distribution). The information distributing server 900 is requested by the portable terminal 1000 or the content server 1100 to transmit the content, and provide various contents received from the content server to the portable terminal 1000 using different communication channels.

Additionally, the portable terminal 1000 may request a content directly from the information distributing server 900, which may then request the content from the content server 1100 using a background process.

Figure 9:
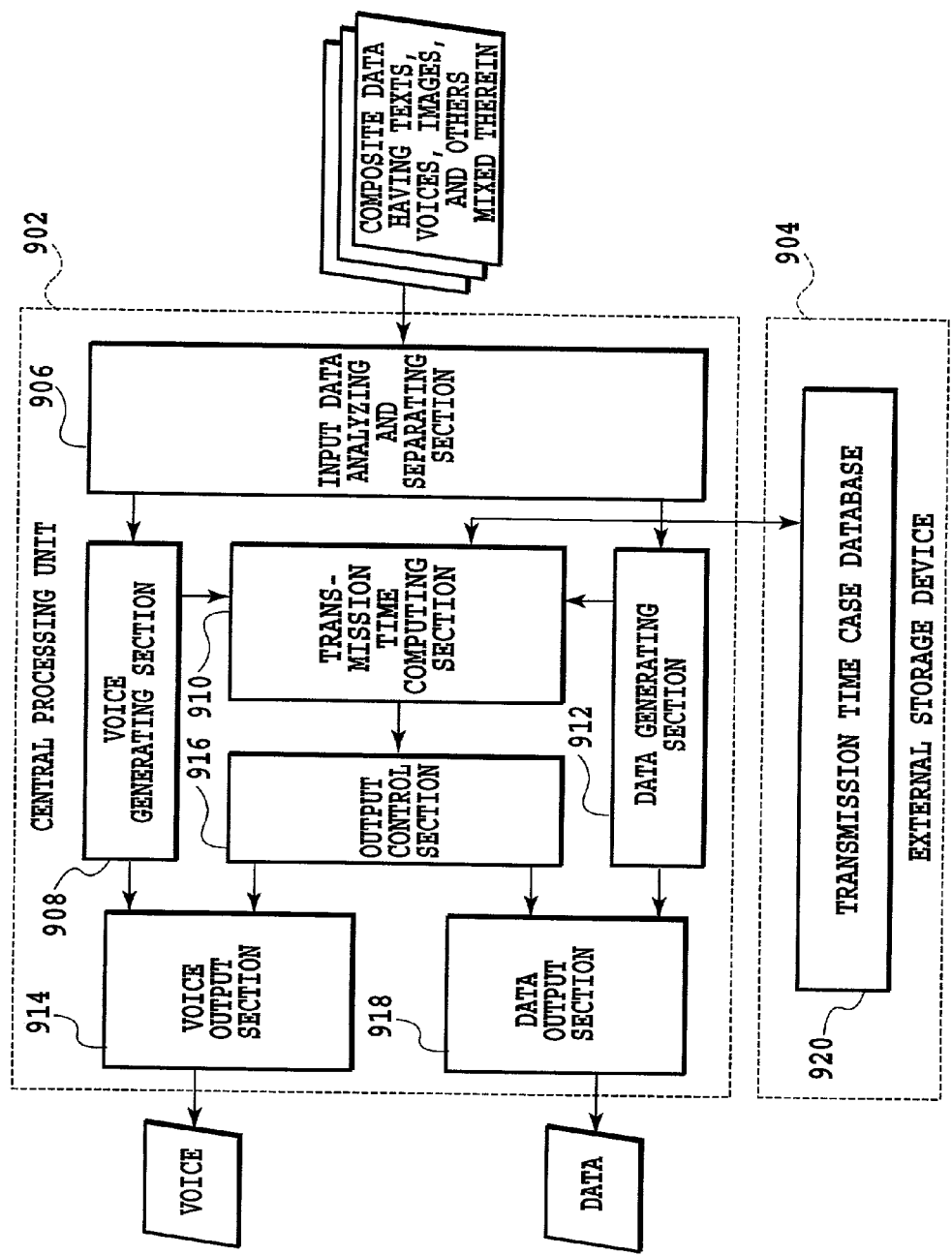
FIG. 9 is a view showing an example of the configuration of an information distributing server to which the present invention is applied.

FIG. 9 is a view showing an example of the configuration of the information processing server 900 to which the present invention is applied and conceptually showing only those parts of the configuration which relate to the present invention.

The information distributing server 900 according to the present invention comprises at least a programmed CPU 902 for integrally controlling the entire system, and an external storage device 904, a communication interface (not shown) connected to a communication device such as a modem, a terminal adapter, a DSU, or a router connected to a communication circuit (including wired/radio, LAN/Internet, and analog/digital circuits) and the like, an input device comprising a pointing device such as a mouse, a keyboard, an image scanner, or a digitizer, a display device (not shown) used to monitor input data, and an output device (not shown) such as a printer which outputs various processing results and other data, which devices are all connected to the CPU 902 via a bus. In addition, the input device, the display device, and the output device may each be connected to the CPU 902 via an I/O interface (not shown). The CPU 902 has an internal memory for storing a control program such as an OS (Operating System), programs defining various process procedures, and required data so that these programs and others can be used to carry out information processing for executing various processes. The external storage device 904 is a memory device such as a RAM or a ROM, a fixed disc device such as a hard disk, or a storage means such as a flexible disk or an optical disk and stores various tables, files, databases, and others which are used for various processes; it stores at least a transmission time case database 920 in which numerical values used as references for calculating the amount of time required for transmission are recorded. Since the input device such as a mouse, a keyboard, or an image scanner, the display device, and the output device such as a printer device are used by a maintainer to maintain and monitor the information distributing server 900, these devices are not required for the configuration of the information distributing server 900. The communication interface has a function of communicating data with another terminal via a communication circuit. The information distributing server 900 may be configured as an arbitrary exchange, a WEB or ASP server, and the like in the network, and its hardware may be configured using an information processing apparatus such as a commercially available workstation or personal computer as well as its attached devices.

In FIG. 9, each block in the CPU 902 shows an example of a block for a function executed by the CPU 902; this figure conceptually shows only those parts of the function of the CPU 902 that relate to the present invention. The functional blocks described herein are implemented by programs and the like executed by the CPU 902 shown in the view of the hardware configuration of the information distributing server 900 described in FIG. 9.

The CPU 902 comprises at least an input data analyzing and separating section 906 for analyzing a content received from the content server, that is, composite data comprising a mixture of data such as voices and images, a voice generating section 908 for generating voices from a voice portion of the content, a voice output section 914 for outputting the generated voices to the portable terminal 1000 via a voice circuit channel, a data generating section 912 for generating data other than the voices from a data portion of the content, a data output section 918 for outputting the generated data to the portable terminal 1000 via a packet channel, a transmission time calculating section 910 for accessing the transmission time case database 920 to calculate the amounts of time required to transmit the voices and the data, and an output control section 916 for controlling voice and data outputs based on the calculated amounts of time for transmission.

Figure 10:
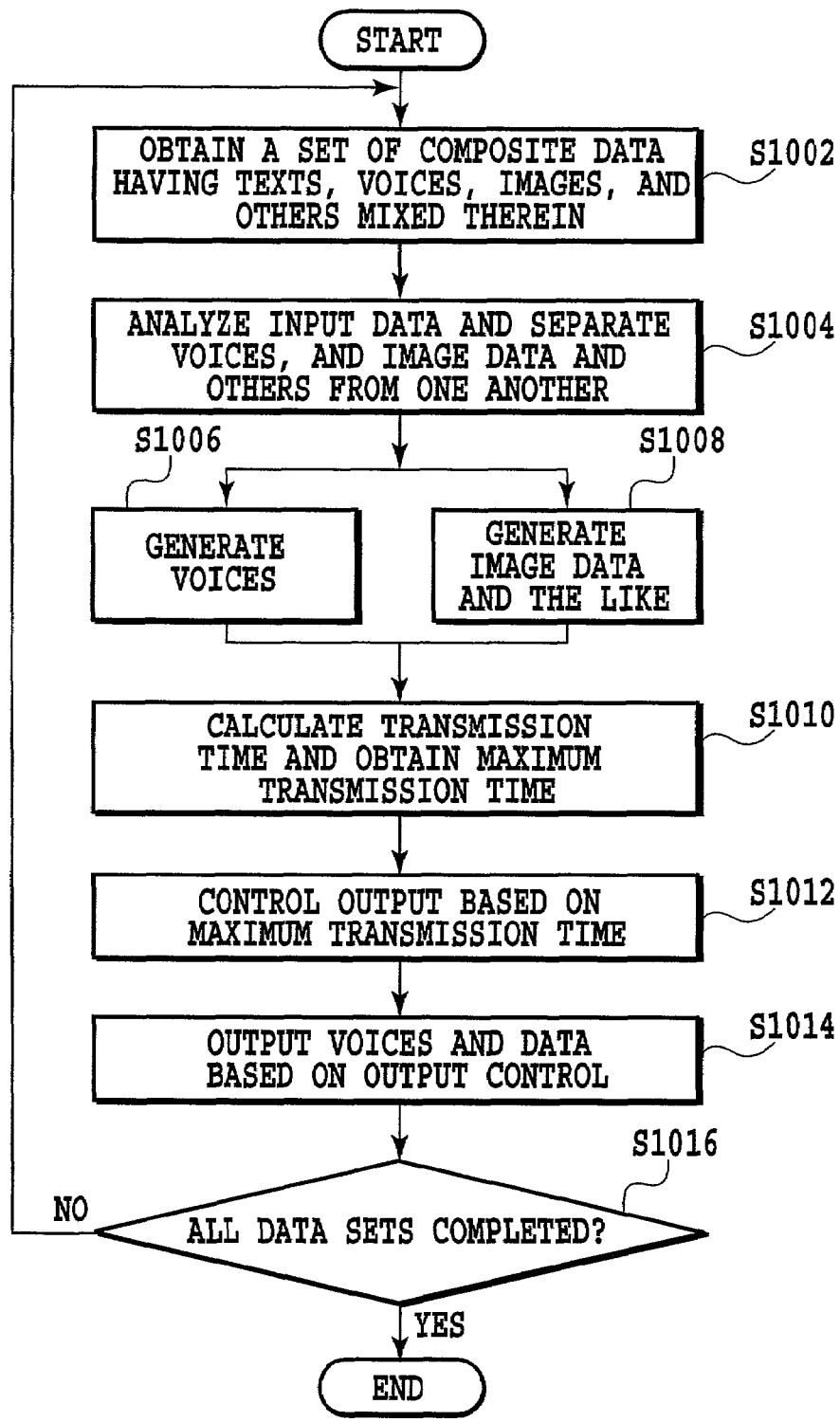
FIG. 10 is a flow chart useful in explaining an example of the operation of an information distributing server according to a third embodiment of the present invention.

Next, an example of the operation of the information distributing server 900 according to this embodiment configured as described above will be explained below in detail with reference to FIG. 10.

First, the input data analyzing and separating section 906 obtains each set of a content received from the content server, that is, of composite data comprising a mixture of data such as voices and images (step S1002), and analyzes the group of these data and separates them into a voice portion and a data portion other than the voices (step S1004). In reading text data out loud, the text data may be contained in the voice portion.

Then, the voice generating section 908 generates appropriate voices for the separated voice portion (step S1006). If the voice portion contains text data, voices are generated by means of voice synthesis and the like. Additionally, the data generating section 912 edits the separated data portion so that it can be appropriately displayed in the portable terminal 1000, to generate image data and the like (step S1008).

Then, based on the generated voices and data, the transmission time calculating section 910 accesses the transmission time case database 920 of the external storage device 904 to calculate the amounts of time required to transmit the voices and the data (step 1010). For example, for text data, the standard amount of time required to read out characters (the fact that 45 characters are normally read out in about 15 seconds, and the like) and parameters such as transmission channels and a pitch speed during generation of synthesized voices are stored in the transmission time case database 920. Then, based on the standard character read-out time and the parameters, the amounts of time for transmission are calculated from the transmission channels, a propagation status, the pitch speed, the contents of text, and others taking an error of several to several tens of seconds into consideration.

Then, based on the calculated maximum transmission time, the output control section 916 controls outputs from the voice output section 914 and data output section 918 (step S1012), and the voice output section 914 and the data output section 918 output voices and data, respectively, to the portable terminal 1000 using different channels (step S1014). If the maximum transmission time is 40 seconds for the voices, the output control section 916 simultaneously commands the voice output section 914 and the data output section 918 to output the voices and the data, respectively, and then controls the data output section 918 to transmit the next data 40 seconds later.

Then, it is determined whether or not all the data sets have been output, and if there remains a next data set to output, that is, the next data set to output which has been received from the content server 1100, the process returns to step S1002 (step S1016).

Thus, a group of data comprising different types of continuous data can sequentially be distributed to the portable terminal 1000 based on the calculated amount of time for each data, so that the mobile terminal 1000 can reference the content without being conscious of synchronization of the set of the group of data.

Other Embodiments

The above described embodiment has been described taking the mobile communication network by way of example, but the present invention is not limited to this case but is applicable to a satellite communication network, a fixed telephone network, and the like.

Additionally, the above described embodiment has been described taking by way of example the case where the information distributing server 900 is installed outside the communication network 1200, but the present invention is not limited to this case. It is obvious to those skilled in the art that the present invention can be implemented whether the information distributing server 900 is installed inside (if it is implemented as an exchange, a network control device, and the like) or outside the network, as long as it is used in the present invention.

In addition, the above described embodiment has been described taking by way of example the case where the information distributing server 900 and the content server 1100 are implemented as independent configurations, but the present invention is not limited to this case. It is obvious to those skilled in the art that in other embodiments, these servers may be configured and implemented by combining them together.

Further, the above described embodiment has been described taking by way of example the case where it is independently implemented, but the present invention is not limited to this case. It is obvious to those skilled in the art that other embodiments can be combined together as appropriate.

Further, the above described embodiment has been described taking the service, system, and the like of NTT DoCoMo (company name) by way of example, but the present invention is not limited to this case. In other embodiments, the present invention may be applied to services, systems, and the like of other companies which have similar functions.

Furthermore, in the above described embodiment, the information distributing server 900 provides information to the portable terminal 1000 using a technique for browsing a display on a Web page, but the information may be transmitted and received using electronic mails or other well-known communication methods, or other communication equipment, for example, telephones or facsimile terminal equipment. The communication form may comprise a communication method other than the Internet.

Various variations other than the above described forms are possible. These variations, however, fall within the technical range of the present invention as long as they are based on technical concepts described in the claims.

As described above in detail, according to the present invention, the information distributing server divides each page of a content received from the content server into voices and data, calculates the amounts of time required to transmit the voices and the data, and transmits the voices and the data to the portable terminal via the separate communication channels. Consequently, a group of data comprising different types of continuous data can sequentially be distributed to the portable terminal via the separate communication channels, based on the calculated amount of time for each data.

Additionally, according to the present invention, the user of the portable terminal can reference the content without being conscious of synchronization of the set of the group of data.

Fourth Embodiment

The fourth embodiment of the present invention will be described below.

Figure 11:
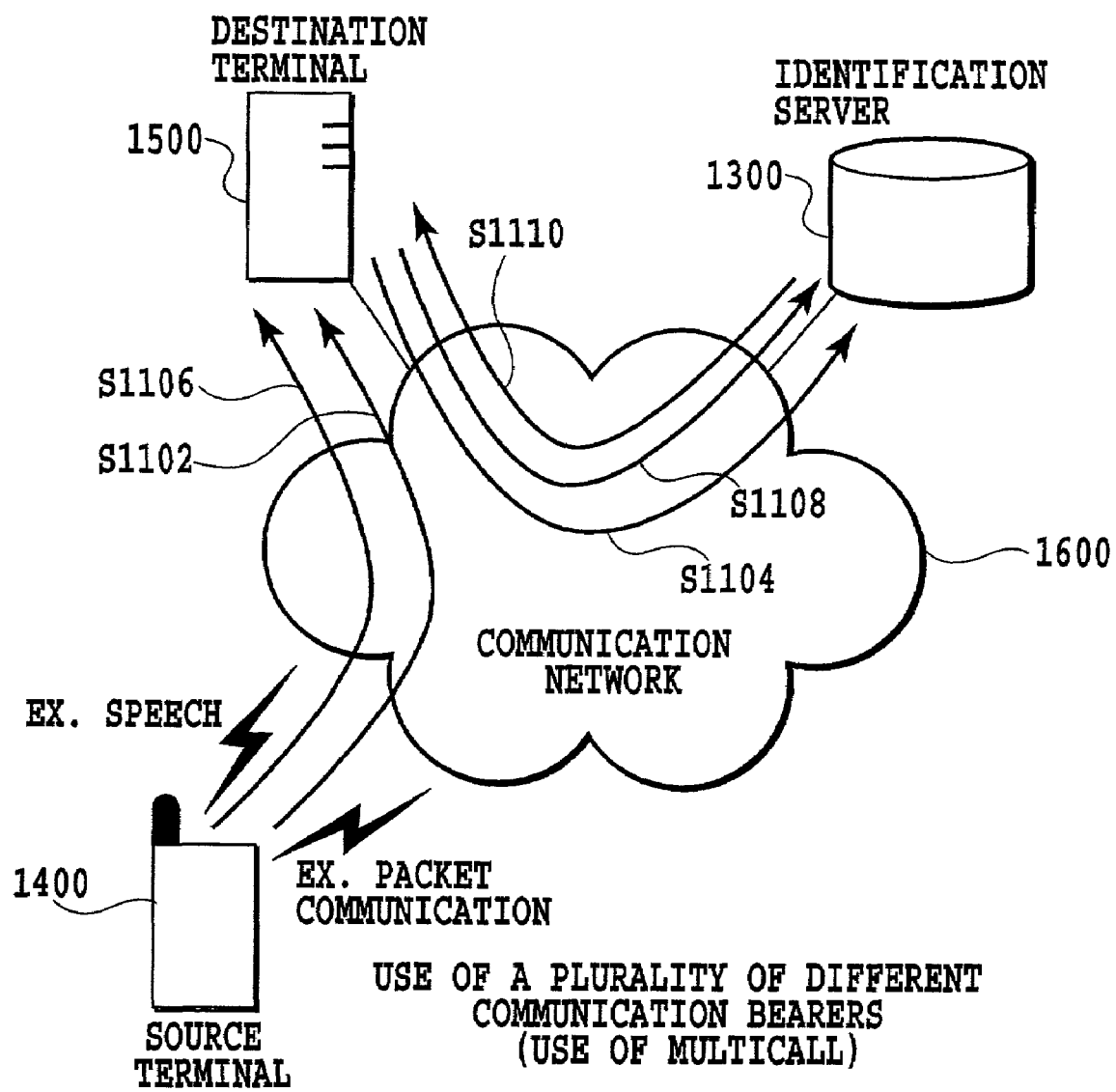
FIG. 11 is a view showing an example of the system configuration of a mobile communication network system to which the present invention is applied.

FIG. 11 is a view showing an example of the configuration of a mobile communication network system to which the present invention is applied and conceptually showing only those parts of the configuration of this system which relate to the present invention.

The mobile communication network system comprises at least an identification server 1300 for identifying different communication channels, a source terminal 1400 or a destination terminal 1500 for originating or receiving data, and a communication network 1600 for connecting these devices together.

The identification server 1300 temporarily holds a source ID unique to the source terminal 1400 in different communication channels to determine whether or not the communication channels are each from the same source terminal 1400, based on the source ID. If it is determined that the communications are from the same source terminal 1400, the identification server 1300 notifies the destination terminal 1500 or a service providing server (not shown) that the communications are the same.

The source terminal 1400 and the destination terminal 1500 are each a known personal computer, workstation, PHS terminal, cellular telephone terminal, mobile communication terminal, or information processing terminal such as a PDA with a mobile communication function; it may be realized by implementing software (containing a program, data, and the like) and the like in the above terminal, the software enabling Web information to be browsed. In particular, the portable terminal may have an electronic mail function or a function of accessing the Internet (for example, the i mode (service name) terminal provided by NTT DoCoMo (company name)).

The communication network 1600 has a function of connecting the identification server 1300, the source terminal 1400, and the destination terminal 1500 together. It may include any of the Internet, the Intranet, a LAN (including both wired and radio networks), the VAN, a public telephone network (including both analog and digital networks), a cellular circuit switching network/cellular packet switching network based on the PDC/PDC-P system, a radio call network, a local radio network, a PHS network, a satellite communication network, and others.

An example of the operation of the mobile communication network system according to this embodiment configured as described above will be described with reference to FIG. 11. In this figure, a case will be explained by way of example, where a Web information service and the like of the Internet and the like is used to transmit data such as images from the source terminal 1400 to the destination terminal 1500 while transmitting voice information in the form of speech in the same direction.

First, a packet communication is transmitted from the source terminal 1400 to the destination terminal 1500 via the communication network 1600 (step S1102).

Then, a status of packet communication is registered in the identification server 1300 for this communication (step S1104).

Then, a speech is transmitted from the source terminal 1400 to the destination terminal 1500 via the communication network 1600 (step S1106).

Subsequently, the identification server 1300 is requested to identify the status of the communications (step S1108). The identification server 1300 retrieves relevant data from the database to determine that the source and the destination are the same as those in a previously registered packet communication.

Then, the result of the identification is provided from the identification server 1300 to the destination terminal 1500 (step S1104). The destination terminal 1500 can thereby determine that the packet communication and the speech belong to the same service. Thus, the source terminal 1400 can also couple a plurality of communication channels together to simultaneously transmit a composite content.

Figure 12:
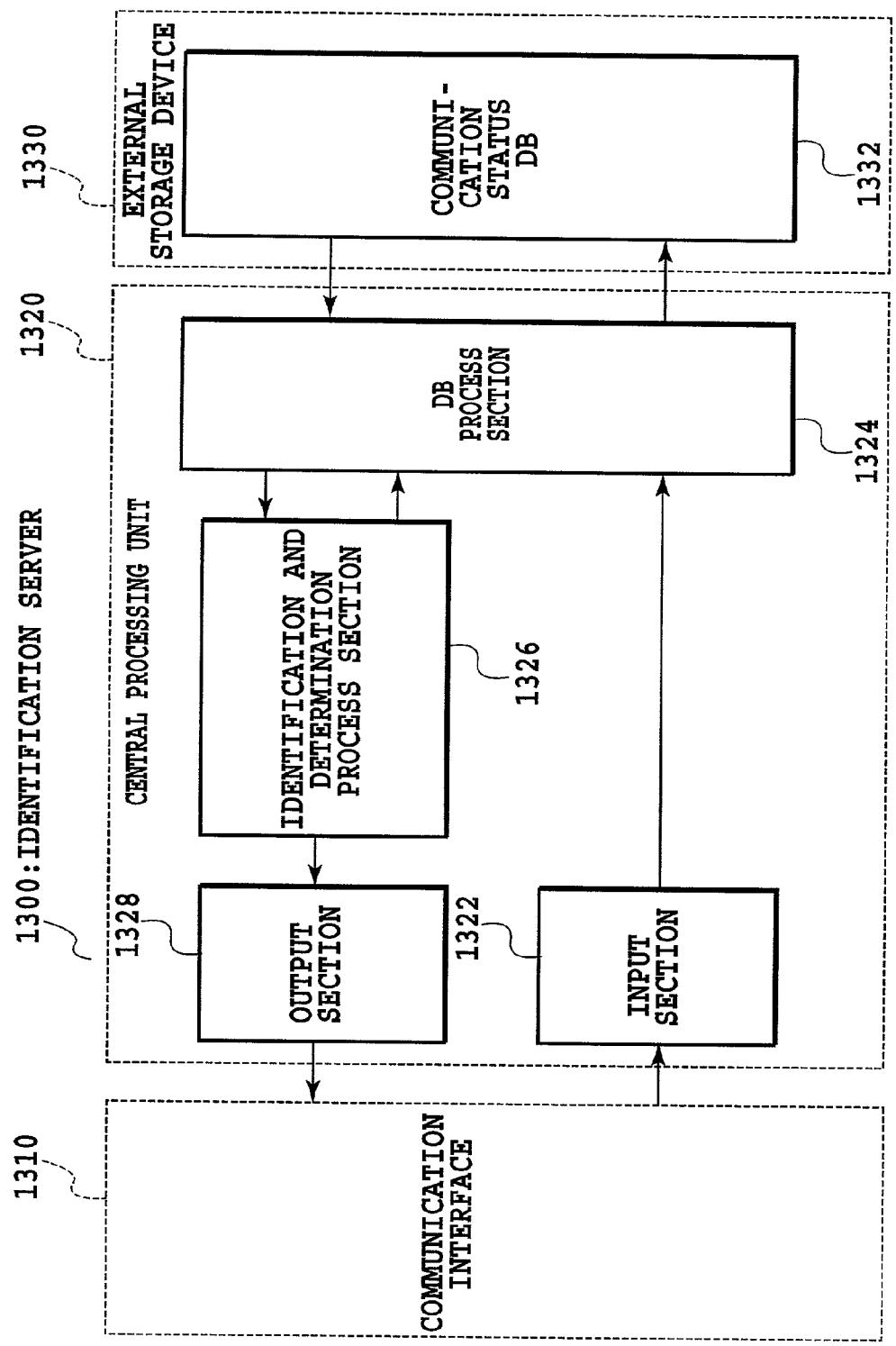
FIG. 12 is a view showing an example of the configuration of an identification server to which the present invention is applied.

FIG. 12 is a view showing an example of the configuration of the identification server 1300 to which the present invention is applied and conceptually showing only those parts of this configuration which relate to the present invention.

The identification server 1300 according to the present invention comprises at least a programmed central processing unit (a control means; hereafter referred to as a "CPU") 1320 for integrally controlling the entire system, and a communication interface 1310 connected to a communication device such as a modem, a terminal adapter, a DSU, or a router connected to a communication circuit (including wired/radio, LAN/Internet, and analog/digital circuits) and the like, an external storage device 1330, an input device (not shown) comprising a pointing device such as a mouse, a keyboard, an image scanner, or a digitizer, a display device (not shown) used to monitor input data, and an output device (not shown) such as a printer which outputs various processing results and other data, which devices are all connected to the CPU 1320 via a bus. The CPU 1320 has an internal memory for storing a control program such as an OS (Operating System), programs defining various process procedures, and required data so that these programs and others can be used to carry out information processing for executing various processes. The external storage device 1330 is a memory device such as a RAM or a ROM, a fixed disc device such as a hard disk, or a storage means such as a flexible disk or an optical disk and stores various tables, files, databases, and others which are used for various processes; it stores at least a communication status database 1332. Since the input device such as a mouse, a keyboard, or an image scanner, the display device, and the output device such as a printer device are used by a maintainer to maintain and monitor the identification server 1300, these devices are not required for the configuration of the identification server 1300. The communication interface 1310 has a function of communicating data with another terminal via a communication circuit. The identification server 1300 may be configured as an arbitrary exchange, a WEB or ASP server, and the like in the network, and its hardware may be configured using an information processing apparatus such as a commercially available workstation or personal computer as well as its attached devices.

In FIG. 12, each block in the CPU 1320 shows an example of a block for a function executed by the CPU 1320; this figure conceptually shows only those parts of the function of the CPU 1320 that relate to the present invention. The functional blocks described herein are implemented by programs and the like executed by the CPU 1320 shown in the view of the hardware configuration of the identification server 1300 described in FIG. 12. The CPU 1320 comprises at least an input section 1322 connected to the communication interface 1310 for controlling the input of a signal, a DB processing section 1324 connected to the external storage device 1330 for controlling accesses to the DB, an identification and determination process section 1326 for executing an identification and determination process, described later, based on the communication status database 1332 stored in the external storage device 1330, and an output section 1328 connected to the communication interface 1310 for controlling the output of a signal.

Figure 13:
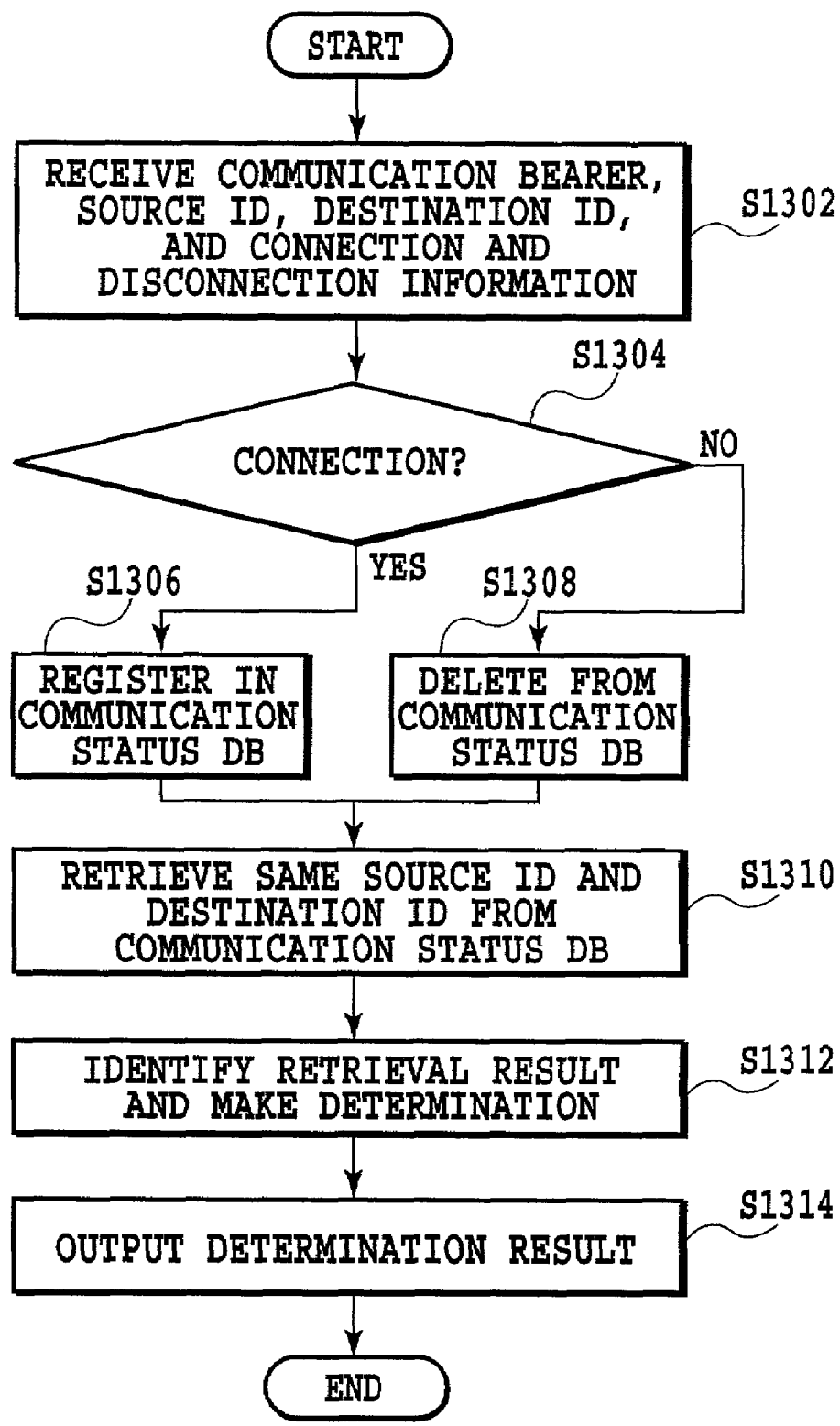
FIG. 13 is a flow chart useful in explaining an example of the operation of an identification server according to a fourth embodiment of the present invention.

Next, an example of the operation of the identification server 1300 according to this embodiment configured as described above will be described below in detail with reference to FIGS. 13 and 14.

First, it receives, from the destination terminal 1500, a communication bearer, a source ID, a destination ID, and connection/disconnection information indicating either connection or disconnection (step S1302).

Then, it determines connection or disconnection based on the connection/disconnection information (step S1304).

In the case of connection, it is registered in the communication status database 1332 of the external storage device 1330 (step S1306), whereas in the case of disconnection, the registration for the connection is removed from the communication status database 1332 of the external storage device 1330 (step S1308).

Then, the communication status database 1332 is referenced to retrieve connections of the same source ID and of the same destination ID if any (step S1310).

Figure 14:
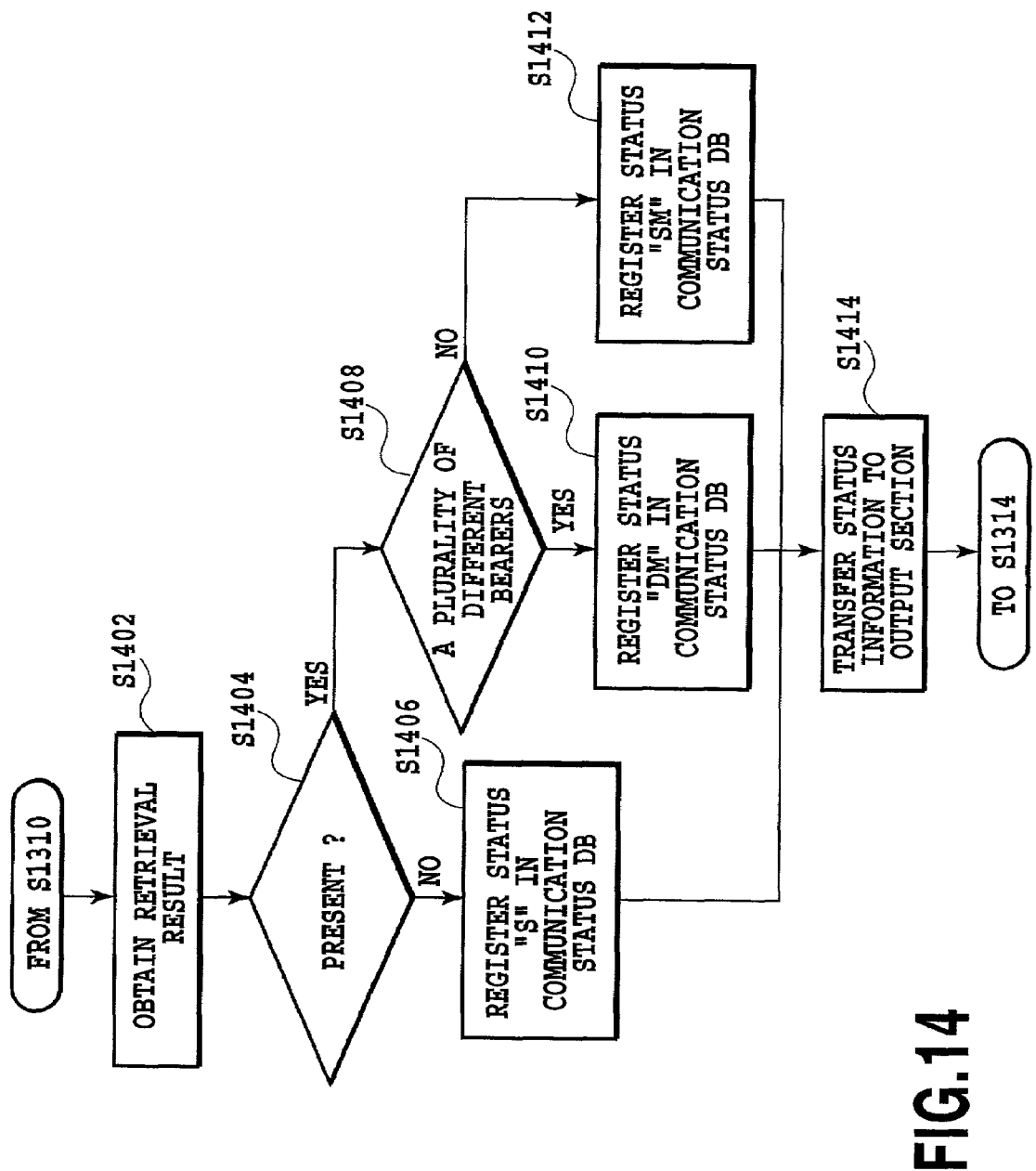
FIG. 14 is a flow chart useful in explaining an example of an identification and determination process executed by an identification and determination process section of a CPU.

Then, an identification and determination process is executed for the results of the retrieval as shown in FIG. 14 in detail (step S1312).

FIG. 14 is a flow chart useful in explaining an example of the identification and determination process executed by the identification and determination process section 1326 of the CPU 1320.

First, the result of the retrieval from the communication status database 1332 is obtained (step S1402) to determine whether or not connections of the same source ID and of the same destination ID are present (step S1404).

If such connections are absent, "S" indicating a new registration is registered in the communication status database (step S1406).

If such connections are present, it is determined whether they comprise a plurality of difference bearers (step S1408).

If they comprise a plurality of different bearers, "DM" indicating that the different bearers are to be updated is registered in the communication status database 1332 for the source and destination IDs (step S1410). On the other hand, if they comprise a plurality of different bearers, "SM" indicating that the same bearers are to be updated is registered in the communication status database 1332 for the source and destination IDs (step S1412).

Then, the contents of each communication status database 1332 are transferred to the output section 1328 (step S1414).

Then, the result of the determination is transmitted to the destination terminal 1500 via the communication interface 1310 (step S1314).

The destination terminal 1500 can thereby determine that the packet communication and the speech belong to the same service. Thus, the source terminal 1400 can also couple a plurality of communication channels together to simultaneously transmit a composite content.

Other Embodiments

The above described embodiment has been described taking the mobile communication network by way of example, but the present invention is not limited to this case but is applicable to a satellite communication network, a fixed telephone network, and the like.

Additionally, the above described embodiment has been described taking by way of example the case where the identification server 1300 is installed outside the communication network 1600, but the present invention is not limited to this case. It is obvious to those skilled in the art that the present invention can be implemented whether the identification server 1300 is installed inside (if it is implemented as an exchange, a network control device, and the like) or outside the network, as long as it is used in the present invention.

Further, the above described embodiment has been described taking by way of example the case where it is independently implemented, but the present invention is not limited to this case. It is obvious to those skilled in the art that other embodiments can be combined together as appropriate.

Further, the above described embodiment has been described taking the service, system, and the like of NTT DoCoMo (company name) by way of example, but the present invention is not limited to this case. In other embodiments, the present invention may be applied to services, systems, and the like of other companies which have similar functions.

Furthermore, in the above described embodiments, the identification server 1300 provides information to the source terminal 1400 and the destination terminal 1500 using a technique for browsing a display on a Web page, but the information may be transmitted and received using electronic mails or other well-known communication methods, or other communication equipment, for example, telephones or facsimile terminal equipment. The communication form may comprise a communication method other than the Internet.

Various variations other than the above described forms are possible. These variations, however, fall within the technical range of the present invention as long as they are based on technical concepts described in the claims.

As described above in detail, according to the present invention, the source terminal is connected to the destination terminal using the first communication channel, which is registered in the identification device. The source terminal is connected to the destination terminal using the second communication channel, which is registered in the identification device in such a manner as to correspond to the first communication channel. The identification device communicates the correspondence between the first and second communication channels to the destination terminal. Thus, the different communication channels can be identified and determined to belong to the same service, thereby providing a mobile communication network system and a communication service providing method that can provide services using a plurality of different communication channels.

Additionally, according to the present invention, the destination terminal can recognize that packet communication and speech belong to the same service, while the source terminal can couple the plurality of communication channels together to simultaneously transmit a composite content.

The present invention has been described in detail with respect to a preferred embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An information distributing method for distributing provided information including image data and/or attached information attached to the image data, from an information providing server to a communication terminal via a network, the information distributing method comprising:
   at said information providing server, an attached information conversion step of converting said attached information to converted information that has been converted to have a desired format suitable for aural read-out;
   at said information providing server, a voice conversion step of converting said converted information to voice signal;
   at said information providing server, a transmission step of transmitting said image data and/or said converted information and said voice signal to said communication terminal;
   a screen display step of displaying said image data and/or said converted information on a screen at said communication terminal;
   at said communication terminal, a voice output step of aurally outputting said converted information; and
   at said communication terminal, a synchronizing step of synchronizing said screen display by said screen display step with said voice output by said voice output step.

2. The information distributing method as claimed in claim 1, wherein
   said transmission step transmits said provided information based on a distribution request command from said communication terminal.

3. The information distributing method as claimed in claim 1, wherein
   said transmission step transmits said provided information to said communication terminals belonging to a particular group or all said communication terminals.

4. The information distributing method as claimed in claim 1, wherein
   said transmission step transmits said provided information to said communication terminal of a particular subscriber who has contracted for distribution of said provided information.

5. An information distributing system for distributing provided information including image data from an information providing server to a communication terminal via a network,
   said information providing server comprising:
      first transmission means for transmitting the image data to said communication terminal;
      first conversion means for converting attached information attached to said image data into converted information of a format suitable for aural read-out;
      second conversion means for converting the converted information into voice information;
      second transmission means for transmitting said voice information and/or said converted information to said communication terminal; and
      third transmission means for transmitting synchronizing information for synchronizing said image data with said voice information on a screen of said communication terminal, and
   said communication terminal comprising:
      means for displaying said image data and/or said converted information on the screen based on said synchronizing information; and
      means for aurally outputting said voice information based on said synchronizing information.

6. The information distributing system as claimed in claim 5, wherein
   said first transmission means further comprises means for transmitting said image information to said communication terminal through a first channel,
   said second transmission means farther comprises means for transmitting said voice information and/or said converted information to said communication terminal through a second channel that is different from said first channel, and
   said third transmission means further comprises means for transmitting said synchronizing information to said communication terminal through said first channel.

7. The information distributing system as claimed in claim 6, wherein
   said first channel is a packet channel and said second channel is a voice channel.

8. An information distributing system comprising a providing device for providing a markup language file distributed to a communication terminal via a network and a processing device for processing said markup language file,
   said processing device comprising:
      generation means for analyzing tags in said markup language file to generate read-out data, displayed data containing anchor information with its links set in another markup language file, and synchronization control information for synchronizing said read-out data with said displayed data; and
      control means for providing such control that said read-out data and said displayed data are synchronously transmitted to said communication terminal based on said synchronization control information, and said communication terminal comprising:
reception means for receiving said read-out data and said displayed data;
voice output means for converting said read-out data into voice data for aural output;
screen display means for displaying said displayed data on a screen; and
selection means for selecting said anchor information displayed on the screen.

9. An information distributing system comprising a providing device for providing a markup language file distributed to a communication terminal via a network and a processing device for processing said markup language file,
said processing device comprising:
generation means for analyzing tags in said markup language file to generate read-out data, displayed data containing anchor information with its links set in another markup language file, and synchronization control information for synchronizing said read-out data with said displayed data;
voice converting means for converting said read-out data into voice data;
packet converting means for converting said displayed data into packet data; and
control means for providing such control that said voice data and said packet data are synchronously transmitted to said communication terminal based on said synchronization control information, and said communication terminal comprising:
reception means for receiving said voice data and said packet data;
voice output means for aurally outputting said voice data;
screen display means for converting said packet data into said displayed data to display said displayed data on a screen; and
selection means for selecting said anchor information displayed on the screen.

10. An information distributing method for an information distributing system comprising a providing device for providing a markup language file distributed to a communication terminal via a network and a processing device for processing said markup language file, the information distributing method comprising:
at said processing device, a generation step of analyzing tags in said markup language file to generate read-out data, displayed data containing anchor information with its links set in another markup language file, and synchronization control information for synchronizing said read-out data with said displayed data;
at said processing device, a control step of providing such control that said read-out data and said displayed data are synchronously transmitted to said communication terminal based on said synchronization control information;
at said communication terminal, a voice output step of converting said read-out data into voice data for aural output;
at said communication terminal, a screen display step of displaying said displayed data on a screen; and
at said communication terminal, a selection step of selecting said anchor information displayed on the screen.

11. An information distributing method for an information distributing system comprising a providing device for providing a markup language file distributed to a communication terminal via a network and a processing device for processing said markup language file, the information distributing method comprising:
at said processing device, a generation step of analyzing tags in said markup language file to generate read-out data, displayed data containing anchor information with its links set in another markup language file, and synchronization control information for synchronizing said read-out data with said displayed data;
at said processing device, a voice converting step of converting said read-out data into voice data;
at said processing device, a packet converting step of converting said displayed data into packet data;
at said processing device, a control step of providing such control that said voice data and said packet data are synchronously transmitted to said communication terminal based on said synchronization control information;
at said communication terminal, a voice output step of aurally outputting said voice data;
at said communication terminal, a screen display step of converting said packet data into said displayed data to display said displayed data on a screen; and
at said communication terminal, a selection step of selecting said anchor information displayed on the screen.

12. An information distributing server for transmitting a content received from a content server for providing a content to a portable terminal using a plurality of communication channels, the information distributing server comprising:
means for dividing said content received from said content server into divided data of each page and divided voices corresponding to the divided data;
means for creating index information for said divided data; and
means for transmitting said divided voices, and said divided data and said index information to said portable terminal via separate communication channels.

13. An information distributing method using a portable terminal, a content server for providing a content, and an information distributing server for transmitting said content to said portable terminal using a plurality of communication channels, the information distributing method comprising:
at said information distributing server, a step of dividing said content received from said content server into divided data of each page and divided voices corresponding to the divided data;
at said information distributing server, a step of creating index information for said divided data; and
a step of transmitting said divided voices, and said divided data and said index information from said information distributing server to said portable terminal via separate communication channels.

14. An information distributing system comprising a portable terminal, a content server for providing a content, and an information distributing server for transmitting said content to said portable terminal using a plurality of communication channels, the information distributing system comprising:
at said information distributing server, means for dividing said content received from said content server into divided data of each page and divided voices corresponding to the divided data;
at said information distributing server, means for creating index information for said divided data; and means for transmitting said divided voices, and said divided data and said index information from said information distributing server to said portable terminal via separate communication channels.

15. An information distributing server for transmitting a content received from a content server for providing a content to a portable terminal using a plurality of communication channels, the information distributing server comprising:
   means for separating said content received from said content server into voices and data;
   means for calculating the amount of time required to transmit said voices via a first communication channels and the amount of time required to transmit said data via a second communication channels; and
   means for transmitting said voices and said data to said mobile terminal via said first and second communication channels respectively in accordance with the maximum amount of transmission time.

16. An information distributing method using a portable terminal, a content server for providing a content, and an information distributing server for transmitting said content to said portable terminal using a plurality of communication channels, the information distributing method comprising:
   at said information distributing server, a step of separating said content received from said content server into voices and data;
   at said information distributing server, a step of calculating the amount of time required to transmit said voices via a first communication channels and the amount of time required to transmit said data via a second communication channels; and
   at said information distributing server, a step of transmitting said voices and said data to said mobile terminal via said first and second communication channels respectively in accordance with the maximum amount of transmission time.

17. An information distributing system comprising a portable terminal, a content server for providing a content, and an information distributing server for transmitting said content to said portable terminal using a plurality of communication channels, the information distributing system comprising:
   at said information distributing server, means for separating said content received from said content server into voices and data;
   at said information distributing server, means for calculating the amount of time required to transmit said voices via a first communication channels and the amount of time required to transmit said data via a second communication channels; and
   at said information distributing server, means for transmitting said voices and said data to said mobile terminal via said first and second communication channels respectively in accordance with the maximum amount of transmission time.

18. A mobile communication network system comprising a source terminal, a destination terminal, and an identification device for identifying communication channels, for providing a single communication service from said source terminal to said destination terminal concurrently using a plurality of communication channels, the mobile communication network system comprising:
   means for connecting said source terminal to said destination terminal using a first communication channel;
   means for registering said first communication channel in said identification device;
   means for connecting said source terminal to said destination terminal using a second communication channel that is concurrently used with said first communication channel;
   means for registering said second communication channel in said identification device in such a manner as to correspond to said first communication channel; and
   means for communicating a correspondence between said first and second communication channels from said identification device to said destination terminal.

19. A communication service providing method that operates in a mobile communication network system comprising a source terminal, a destination terminal, and an identification device for identifying communication channels, to provide a single communication service from said source terminal to said destination terminal concurrently using a plurality of communication channels, the communication service providing method comprising:
   a step of connecting said source terminal to said destination terminal using a first communication channel;
   a step of registering said first communication channel in said identification device;
   a step of connecting said source terminal to said destination terminal using a second communication channel that is concurrently used with said first communication channel;
   a step of registering said second communication channel in said identification device in such a manner as to correspond to said first communication channel; and
   a step of communicating a correspondence between said first and second communication channels from said identification device to said destination terminal.

* * * * *